US012762875B2

(12) United States Patent
Yu et al.

(10) Patent No.: US 12,762,875 B2

(45) Date of Patent: Oct. 13, 2026

(54) SEMANTIC LABELING OF IMAGES WITH GENERATIVE LANGUAGE MODEL

(71) Applicant: Lemon Inc., Grand Cayman (KY)

(72) Inventors: Qihang Yu, Los Angeles, CA (US); Xiaohui Shen, Los Angeles, CA (US); Liang-Chieh Chen, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 310 days.

(21) Appl. No.: 18/509,072

(22) Filed: Nov. 14, 2023

(65) Prior Publication Data

US 2025/0157235 A1 May 15, 2025

(51) Int. Cl.

| | |
|---|---|
| ***G06V 20/70*** | (2022.01) |
| ***G06F 16/334*** | (2025.01) |
| ***G06F 40/30*** | (2020.01) |
| ***G06V 10/25*** | (2022.01) |
| ***G06V 10/26*** | (2022.01) |
| ***G06V 10/77*** | (2022.01) |

(Continued)

(52) U.S. Cl.

CPC .......... *G06V 20/70* (2022.01); *G06F 16/3344* (2019.01); *G06F 40/30* (2020.01); *G06V 10/25* (2022.01); *G06V 10/267* (2022.01); *G06V 10/7715* (2022.01); *G06V 10/774* (2022.01); *G06V 20/50* (2022.01)

(58) Field of Classification Search

CPC ...... G06V 20/70; G06V 10/25; G06V 10/267; G06V 10/7715; G06V 10/774; G06V 20/50; G06V 10/82; G06V 10/26; G06V 10/40; G06F 16/3344; G06F 40/30; G06N 3/045; G06N 3/0455; G06N 3/0499; G06N 3/084

See application file for complete search history.

(56) References Cited

U.S. PATENT DOCUMENTS

| | | | | |
|---|---|---|---|---|
| 2013/0013535 A1* | 1/2013 | Punera | .................. | G06F 16/953 706/12 |
| 2024/0161520 A1* | 5/2024 | Li | .......................... | G06N 3/044 |

OTHER PUBLICATIONS

X. Zou et al., "Generalized Decoding for Pixel, Image, and Language," 2023 IEEE/CVF Conference on Computer Vision and Pattern Recognition (CVPR), Vancouver, BC, Canada, 2023, pp. 15116-15127 (Year: 2023).*

(Continued)

*Primary Examiner* — Chan S Park

*Assistant Examiner* — Emily Rose Hauk

(74) *Attorney, Agent, or Firm* — Alleman Hall LLP

(57) ABSTRACT

A computing system including one or more processing devices configured to receive an image. The processing devices are further configured to compute a segmentation mask that identifies a region of interest included in the image. At a feature extractor, the processing devices are further configured to compute encoded image features based on the image. The processing devices are further configured to receive a text instruction. At a visual resampler, the processing devices are further configured to compute a mask query based on the segmentation mask, the encoded image features, and the text instruction. At a generative language model, the processing devices are further configured to receive a natural language query that includes the mask query and the text instruction. Based on the natural language query, at the generative language model, the processing devices are further configured to generate and output a semantic label associated with the region of interest.

18 Claims, 21 Drawing Sheets

(51) Int. Cl.
*G06V 10/774* (2022.01)
*G06V 20/50* (2022.01)

(56) References Cited

OTHER PUBLICATIONS

B. Cheng et al., "Masked-attention Mask Transformer for Universal Image Segmentation", 2022 IEEE/CVF Conference on Computer Vision and Pattern Recognition (Year: 2022).*

P. Rewatbowornwong et al., "Zero-Guidance Segmentation Using Zero Segment Labels", 2023 arXiv (Year: 2023).*

Dai, W. et al., "InstructBLIP: Towards General-purpose Vision-Language Models with Instruction Tuning," arXiv:2305.06500v2, Jun. 15, 2023, 17 pages.

Yu, Q. et al., "Convolutions Die Hard: Open-Vocabulary Segmentation with Single Frozen Convolutional CLIP," arXiv:2308.02487v1, Aug. 4, 2023, 19 pages.

Li, J. et al., "BLIP-2: Bootstrapping Language-Image Pre-training with Frozen Image Encoders and Large Language Models," arXiv:2301.12597v3, Jun. 15, 2023, 13 pages.

Kirillov, A. et al., "Segment Anything," Proceedings of IEEE/CVF International Conference on Computer Vision, Oct. 1, 2021, Paris, France, 12 pages.

Li, X. et al., "Prefix-Tuning: Optimizing Continuous Prompts for Generation," arXiv:2101.00190v1, Jan. 1, 2021, 15 pages.

Touvron, H. et al., "LLaMA: Open and Efficient Foundation Language Models," arXiv:2302.13971v1, Feb. 27, 2023, 27 pages.

Yu, Q. et al., "k-means Mask Transformer," Proceedings of European Conference on Computer Vision, Oct. 23, 2022, Tel Aviv, Israel, 20 pages.

* cited by examiner

1

TABLE 1

| methods | | COCO | | LVIS | | ADE20K | | Cityscapes | | A847 | | PC459 | | Avg | |
|---|---|---|---|---|---|---|---|---|---|---|---|---|---|---|---|
| | | Acc | NIV | Acc | NIV | Acc | NIV | Acc | NIV | Acc | NIV | Acc | NIV | Acc | NIV |
| Single Dataset | | | | | | | | | | | | | | | |
| COCO Only | | 85.5 | $5.3e^{-5}$ | - | - | - | - | - | - | - | - | - | - | - | - |
| LVIS Only | | - | - | 68.3 | $2.4e^{-3}$ | - | - | - | - | - | - | - | - | - | - |
| ADE20K Only | | - | - | - | - | 82.3 | $4.3e^{-4}$ | - | - | - | - | - | - | - | - |
| Cityscapes Only | | - | - | - | - | - | - | 79.4 | $4.9e^{-4}$ | - | - | - | - | - | - |
| A847 Only | | - | - | - | - | - | - | - | - | 76.9 | $3.3e^{-3}$ | - | - | - | - |
| PC459 Only | | - | - | - | - | - | - | - | - | - | - | 80.9 | $6.9e^{-3}$ | - | - |
| Multiple Datasets | | | | | | | | | | | | | | | |
| Learnable Embed | | 84.3 | 0.00 | 67.3 | 0.00 | 82.3 | 0.00 | 81.0 | 0.00 | 76.0 | 0.00 | 82.5 | 0.00 | 78.9 | 0.00 |
| Text Embed | | 83.4 | 0.00 | 65.4 | 0.00 | 81.5 | 0.00 | 81.6 | 0.00 | 75.1 | 0.00 | 81.7 | 0.00 | 78.1 | 0.00 |
| OSM | vocab-agnostic | 74.9 | 11.1 | 56.8 | 10.0 | 80.6 | 2.31 | 81.1 | 0.01 | 75.6 | 0.60 | 77.8 | 5.69 | 74.5 | 4.95 |
| | vocab-specific | 84.7 | 0.10 | 67.0 | 0.62 | 82.1 | 0.55 | 81.1 | $7.0e^{-5}$ | 76.4 | 0.49 | 80.8 | 1.90 | 78.7 | 0.61 |
| OSM † | vocab-agnostic | 79.5 | 8.75 | 64.6 | 8.22 | 83.8 | 2.11 | 88.7 | 0.01 | 76.6 | 0.81 | 80.6 | 3.74 | 79.0 | 3.94 |
| | vocab-specific | 87.0 | 0.11 | 72.7 | 0.94 | 85.2 | 0.31 | 88.6 | 0.01 | 78.1 | 0.49 | 83.0 | 0.55 | 82.4 | 0.40 |

FIG. 5

2A

TABLE 2A

| Input Res. | 224 | 448 | 672 | 896 | 1120 | 1344 | 1568 |
|---|---|---|---|---|---|---|---|
| Avg Acc | 57.3 | 70.1 | 75.2 | 78.7 | 79.9 | 76.6 | 75.9 |
| Avg NIV | 0.89 | 0.84 | 1.01 | 0.61 | 0.74 | 3.5 | 3.5 |

(a) Input Resolution

2B

TABLE 2B

| Sliding Stride | Global | 224 | 168 | 112 |
|---|---|---|---|---|
| Avg Acc | 71.5 | 78.7 | 79.5 | 79.6 |
| Avg NIV | 0.68 | 0.61 | 0.59 | 0.56 |

(b) Sliding-Window Stride

2C

| vocab queries | None | Vocab-Agnostic | Vocab-Specific |
|---|---|---|---|
| Avg Acc | 74.8 | 74.5 | 78.7 |
| Avg NIV | 4.45 | 4.95 | 0.61 |

(c) Mode Query

TABLE 2C

2D

| Ratio | Global | 0.0× | 0.1× | 0.2× | 0.3× | 0.4× | 0.5× | 0.6× |
|---|---|---|---|---|---|---|---|---|
| Avg Acc | 78.7 | 79.5 | 80.5 | 80.6 | 80.9 | 80.9 | 81.3 | 81.0 |
| Avg NIV | 0.61 | 0.51 | 0.43 | 0.50 | 0.62 | 0.56 | 0.47 | 0.50 |

(d) Context Enlargement Ratio

TABLE 2D

FIG. 6

3

TABLE 3

| methods | proposal network backbone | COCO PQ | ADE20K PQ | ADE20K mIoU | Cityscapes PQ | Cityscapes mIoU |
|---|---|---|---|---|---|---|
| Specialist Models (one model per dataset) | | | | | | |
| Mask2Former | R50 | 51.9 | 39.7 | 46.1 | 62.1 | 77.5 |
| Mask2Former | Swin-L | 57.8 | 48.1 | 54.5 | 66.6 | 82.9 |
| Generalist Models (one model for all datasets) | | | | | | |
| LMSeg | R50 | 38.6 | 35.4 | 45.2 | 54.8 | 80.9 |
| DaTaSeg | R50 | 49.0 | 29.8 | 48.1 | - | - |
| DaTaSeg | ViTDet-L | 53.5 | 33.4 | 54.0 | - | - |
| OSM | R50 | 53.3 | 43.8 | 50.0 | 59.5 | 77.0 |
| OSM | ConvNeXt-L | 56.1 | 49.7 | 55.2 | 64.7 | 80.2 |

FIG. 7

4

TABLE 4

1. What is in the segmentation mask? Assistant: {class_name}
2. Describe what is in the segmentation mask. Assistant: {class_name}
3. What does this segmentation mask show? Assistant: {class_name}
4. What is this segmentation mask? Assistant: {class_name}
5. What is the segmentation mask region of the image? Assistant: {class_name}
6. Briefly describe what you perceive in the segmentation mask region. Assistant: {class_name}
7. Please tell the category of what is indicated by the segmentation mask. Assistant: {class_name}
8. What does this segmentation mask segments? Assistant: {class_name}
9. What does this segmentation mask capture? Assistant: {class_name}
10. Answer the name of what is in the segmentation mask region. Assistant: {class_name}
11. What is the semantic class of the area given the segmentation mask? Assistant: {class_name}
12. Can you describe what is in the segmentation mask region? Assistant: {class_name}
13. From the image and segmentation mask provided, tell the category of the indicated region. Assistant: {class_name}
14. Could you use a few words to describe what is in the segmentation mask region? Assistant: {class_name}
15. Given the image and segmentation mask, answer what is in the region. Assistant: {class_name}
16. Tell me what you see in the segmentation mask region. Assistant: {class_name}
17. What can you see in the segmentation mask region? Assistant: {class_name}
18. Let me know what you can perceive in the mask region. Assistant: {class_name}
19. Give me the name of the object in the segmentation mask. Assistant: {class_name}

FIG. 8

5

TABLE 5

| methods | PQ | AP | mIoU |
|---|---|---|---|
| OpenSeg | - | - | 21.1 |
| MaskCLIP | 15.1 | 6.0 | 23.7 |
| FreeSeg | 16.3 | 6.5 | 24.6 |
| FC-CLIP | 17.8 | 11.1 | 20.8 |
| ODISE | 19.5 | 10.8 | 23.8 |
| OSM | 21.4 | 12.4 | 26.9 |
| OVSeg* | - | - | 24.8 |
| SAN* | - | - | 33.3 |
| ODISE* | 23.4 | 13.9 | 28.7 |
| FC-CLIP* | 26.8 | 16.8 | 34.1 |
| OSM * | 26.9 | 16.2 | 33.6 |

FIG. 13

SEMANTIC LABELING OF IMAGES WITH GENERATIVE LANGUAGE MODEL

BACKGROUND

Machine perception is a field in which machine learning techniques have seen widespread use in recent years as deep learning methods have advanced. One such area of machine perception is computer vision, which includes tasks such as image recognition and labeling. Computer vision tasks are frequently performed using machine learning models in applications such as automatic captioning and optical character recognition, as well as applications such as autonomous driving that involve extracting semantic understanding from images of a device's physical surroundings.

SUMMARY

According to one aspect of the present disclosure, a computing system is provided, including one or more processing devices configured to receive an image. The one or more processing devices are further configured to compute a segmentation mask that identifies a region of interest included in the image. At a feature extractor, the one or more processing devices are further configured to compute a plurality of encoded image features based at least in part on the image. The one or more processing devices are further configured to receive a text instruction. At a visual resampler, the one or more processing devices are further configured to compute a mask query based at least in part on the segmentation mask, the plurality of encoded image features, and the text instruction, the mask query including a plurality of text tokens. At a generative language model, the one or more processing devices are further configured to receive a natural language query that includes the mask query and the text instruction. Based at least in part on the natural language query, at the generative language model, the one or more processing devices are further configured to generate a semantic label associated with the region of interest. The one or more processing devices are further configured to output the semantic label.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5 shows a table of values of classification accuracy and not-in-vocabulary (NIV) rate for OSM, according to the example of FIG. 3A.

FIG. 6 includes tables that that show the results of ablation studies on OSM, according to the example of FIG. 3A.

FIG. 7 shows a table that compares the performance of OSM to that of other generalist segmentation models, according to the example of FIG. 3A.

FIG. 8 shows a table of instruction templates that may be received at a generative language model, according to the example of FIG. 3A.

FIG. 13 shows a table that compares OSM to conventional open-vocabulary labeling methods, according to the example of FIG. 3A.

DETAILED DESCRIPTION

Figure 1:
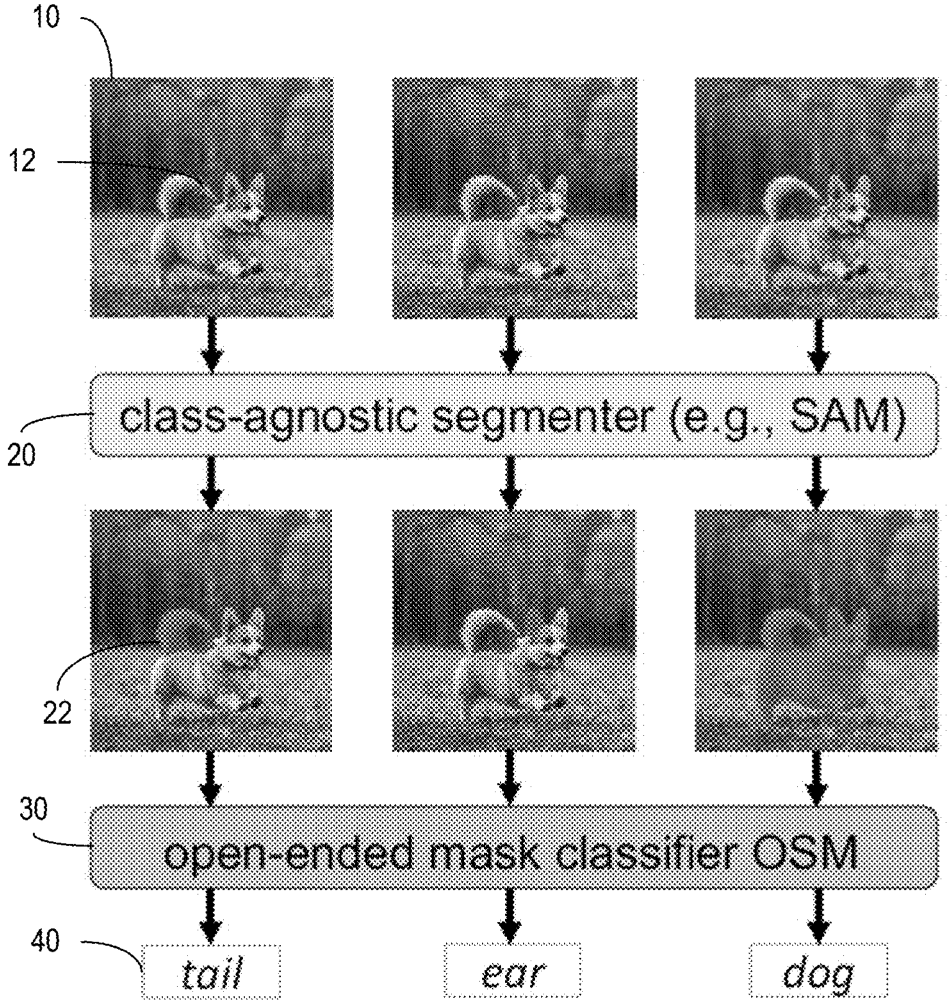
FIG. 1 illustrates open-ended recognition performed on an image, according to one example embodiment.

Localizing and recognizing objects in the open-ended physical world poses a long-standing challenge within the domain of machine perception. Recent methods have endeavored to address the issue by employing a class-agnostic mask (or box) proposal model, complemented by an open-vocabulary classifier (e.g., CLIP) trained using pre-extracted text embeddings. However, it is worth noting that these open-vocabulary recognition models still exhibit limitations in practical applications. On one hand, they rely on the provision of class names during testing, where the recognition performance heavily depends on this predefined set of semantic classes by users. On the other hand, when training with multiple datasets, human intervention is required to alleviate the label definition conflict between them.

In the present disclosure, a Large Language Model (LLM) based mask classifier, referred to herein as the OmniScient Model (OSM), is introduced to addressed the aforementioned challenges. Specifically, OSM predicts class labels in a generative manner, thus removing the need to supply class names during both training and testing. It also enables cross-dataset training without manual intervention, exhibiting robust generalization capabilities due to the world knowledge acquired from the LLM. By combining OSM with a mask proposal model, promising results are presented on various benchmarks, and its effectiveness in handling out-of-domain images is demonstrated.

1. Introduction

A technical challenge in the realm of machine perception involves the accurate localization and recognition of objects in real-world settings. While considerable progress has been made on various standard benchmarks, existing methods continue to grapple with the complexities of real-life scenarios where novel out-of-training dataset concepts frequently arise. To address this issue and enhance the practical utility of models, a common strategy is to decompose the problem into two components: class-agnostic mask/box proposal and mask/box classification. It has been observed that mask/box proposal models, when trained on a dataset such as COCO, can still effectively generalize to previously unseen concepts. Additionally, recent advancements, exemplified by Segment Anything Model (SAM), have expanded the training dataset to an extensive scale, encompassing 1.1 billion class-agnostic masks from 11 million images. This expansion has yielded a mask proposal model characterized by robust zero-shot segmentation capabilities, generalizing to novel images and concepts.

Despite such progress in the development of general proposal models, addressing the challenge of classifying novel concepts in real-world scenarios remains an unsolved issue. Many of the existing approaches leverage vision-language models (VLMs), such as CLIP and ALIGN, which have been pretrained on extensive Internet datasets and have demonstrated outstanding performance in aligning images and text within a shared embedding space. Specifically, these existing approaches train open-vocabulary classifiers that rely on the precomputed text embeddings derived from VLMs, as opposed to learning label embeddings directly from the training dataset. The dependency on VLM text embeddings highlights the inherent power and generalization capabilities of VLMs, which, to a certain extent, ensures the classifier's ability to generalize to novel concepts.

Although the previous methods discussed above have shown promise, they are still confronted with several challenges that impede their practical application. Firstly, these models typically operate under the assumption that class names are predefined during testing, a condition seldom met in real-life scenarios. Furthermore, when utilizing multiple diverse datasets, complications arise when different label definitions or label space conflicts exist among them, such as differences in level of abstraction or specificity between the label spaces. Consequently, many current multi-dataset frameworks address this issue by training on each dataset with an individual decoder or classifier, or merge the label space manually, adding complexity to the process.

To address these challenges, a machine learning model referred to herein as OmniScient Model (OSM) is introduced. OSM includes a generative framework that can be applied to open-ended recognition tasks. Instead of training the model to "select" correct classes from a predefined vocabulary, the present approach focuses on training the model to generate the desired class names. This paradigm shift means that the model no longer requires the prior knowledge of all possible class names provided by users, eliminating the necessity for a well-defined vocabulary during both training and testing phases. Consequently, this approach naturally accommodates training and testing on datasets with varying label spaces, obviating the need for human intervention to harmonize the differences. Additionally, by building upon a pre-trained Large Language Model (LLM), OSM leverages the implicitly learned world knowledge encoded within the LLM, enhancing its ability to effectively generalize to novel concepts, further bolstering its utility and reliability.

Experiments are discussed below that were used to evaluate the appropriateness of employing a generative model for discriminative tasks. The investigation includes assessing the generative model's ability to effectively capture and adapt to the characteristics of a given training dataset and its associated vocabulary. Its performance is compared to that of a discriminative model, primarily focusing on classification accuracy. Additionally, a Mode Query mechanism, which empowers the model to make predictions within a predefined vocabulary (referred to as vocabulary-specific predictions), or to provide open-ended predictions without vocabulary constraints (referred to as vocabulary-agnostic predictions), is introduced. Finally, OSM is integrated with various off-the-shelf segmenters (i.e., mask proposal models), such as kMaX-DeepLab and SAM, and its effectiveness across several benchmarks is validated.

2. Related Work

Open-Vocabulary Recognition

Recently, as exemplified by CLIP and ALIGN, open-vocabulary recognition methods have demonstrated promising outcomes. These methods involve the pre-training of dual-encoder models (for image and text) using contrastive objectives on extensive collections of noisy image-text pairs. This pre-training process yields feature representations that possess cross-model capabilities, showcasing robust performance in zero-shot downstream tasks. Drawing inspiration from these advances, the field of open-vocabulary detection and segmentation has also witnessed remarkable breakthroughs, where class names provided during testing may not have been encountered during the training phase. A majority of these state-of-the-art techniques approach the problem by disentangling it into class-agnostic proposals, along with open-vocabulary proposal classification by leveraging a pre-trained CLIP model. However, despite the impressive accomplishments of these open-vocabulary methods in recognizing unseen classes beyond the training dataset, they hinge on a strong yet brittle assumption that the semantic classes (i.e., vocabulary) are known in advance and remain static, an assumption that can easily be disrupted in practical applications. In parallel with research efforts, vocabulary-free image classification seeks to address this challenge by dynamically generating vocabularies through processes such as parsing captions or retrieving them from external databases. By contrast, the approach discussed below reformulates the open-ended classification problem as text generation, naturally eliminating the need for a user-predefined vocabulary.

FIG. 1 illustrates an example of open-ended recognition. In the example of FIG. 1, an input image 10 is shown, along with three different indicated locations 12 within the input image 10. The open-ended recognition task is decomposed into two sub-tasks: class-agnostic mask proposal and open-ended mask classification. To tackle the task, the open-ended mask classifier OSM 30 works hand in hand with a class-agnostic mask proposal model 20 (e.g., SAM) at which segmentation masks 22 are computed. Unlike existing open-vocabulary recognition models, OSM 30 does not require any user-predefined vocabulary and may instead directly predict the class 40 of each proposal with an unconstrained vocabulary in a generative manner. As a result, OSM 30 shows great generalization ability. In the example of FIG. 1 in which the image predicts a dog, emergent part predictions such as tail and ear are observed, despite OSM 30 having never seen such masks 22 or labels 40 during training. Moreover, by obtaining masks 22 from a class-agnostic segmenter 20, a wide range of prompt types including point, box, and mask can be utilized.

Large Language Models

In recent years, the research community has witnessed a remarkable surge in the development of Large Language Models (LLMs). These models have demonstrated impressive emergent capabilities, including in-context learning, instruction following, and chain-of-thought reasoning. However, a significant limitation of these LLMs is their inherent "blindness" to other modalities, such as visual inputs. More recently, multi-modal LLMs have been developed. Pioneering research has illustrated a promising avenue for bridging the gap between language and vision modalities. This approach involves constructing modular models that typically consist of a frozen CLIP vision encoder, a trainable bridging module, and a frozen LLM. Furthermore, referring or grounding abilities may be added to the multi-modal LLM by taking bounding boxes as inputs or outputs. The proposed OSM can be categorized as a modular multi-modal LLM with referring capability. However, previous endeavors primarily aim to enhance multi-modal LLMs with bounding boxes (as a bounding box can be naturally represented in text by referring to its coordinates) for conversation applications, which also require providing vocabulary in the input prompt. The techniques discussed herein underscore the value of enabling multi-modal LLMs to recognize segmentation masks and serve as standalone tools.

3. Method

In this section, OSM (OmniScient Model), an open-ended recognizer, is introduced. The conventional classification task is transformed into a text generation task, aligning with the principles outlined in (Sec. 3.1). The construction of OSM is elucidated, which follows the footsteps of previous modular vision-language models (Sec. 3.2). A comprehensive overview of the training and evaluation protocols is also provided (Sec. 3.3).

3.1. Problem Formulation of Classification

Without loss of generality, the present discussion focuses on mask classification. Given an input image $I \in \mathbb{R}^{H \times W \times 3}$ and a collection of M segmentation masks $M \in \mathbb{R}^{H \times W \times M}$ (from a pretrained segmenter, e.g., SAM), the objective is to predict a semantic class for each of these masks:

$$\{y_i\}_{i=1}^{M} = \{(m_i, c_i)\}_{i=1}^{M} \quad (1)$$

where $m_i$ is the i-th mask from M and $c_i$ is its predicted class, belonging to the set of predefined semantic classes C, which is assumed to be known during both training and testing phases. In a closed-vocabulary setting, models focus solely on the target classes, implying that the set of pre-defined semantic classes are identical during both training and testing (i.e., $C_{train}=C_{test}$, where the subscript de-notes the training or testing phase). By contrast, in an open-vocabulary setting, this assumption is relaxed by allowing for the possibility that $C_{test}$ may include novel categories that were not seen during training (i.e., $C_{test} \neq C_{train}$). Nevertheless, in both cases, the category names of $C_{train}$ and $C_{test}$ are used during both the training and testing stages. As a result, the recognition performance heavily hinges on the careful design of $C_{train}$ and $C_{test}$ via prompt engineering.

The aforementioned assumption (i.e., the access to $C_{train}$ and $C_{train}$) plays a pivotal role in contemporary recognition frameworks, whether operating in a closed-vocabulary or open-vocabulary context. These frameworks typically rely on computing similarity logits across semantic class candidates and selecting the candidate with the highest probability as the final prediction. While these recognition methods have demonstrated effectiveness and success across various tasks and benchmarks over the past decades, they are not without critical limitations. Firstly, it is practically impossible to predefine and encompass all potential semantic classes present in the real world. This limitation poses a significant challenge in previous approaches to open-vocabulary recognition, since it necessitates the prior definition of novel concepts within the vocabulary. Furthermore, many of these methods are constructed around a handcrafted and meticulously designed label space, with the expectation of covering common concepts that should ideally have unambiguous definitions. However, the manual curation of label spaces may not be scalable, particularly when researchers aim to expand their models to encompass all available datasets from various sources. This process may require labor-intensive tasks such as meticulous manual merging or conducting separate training.

Figure 2:
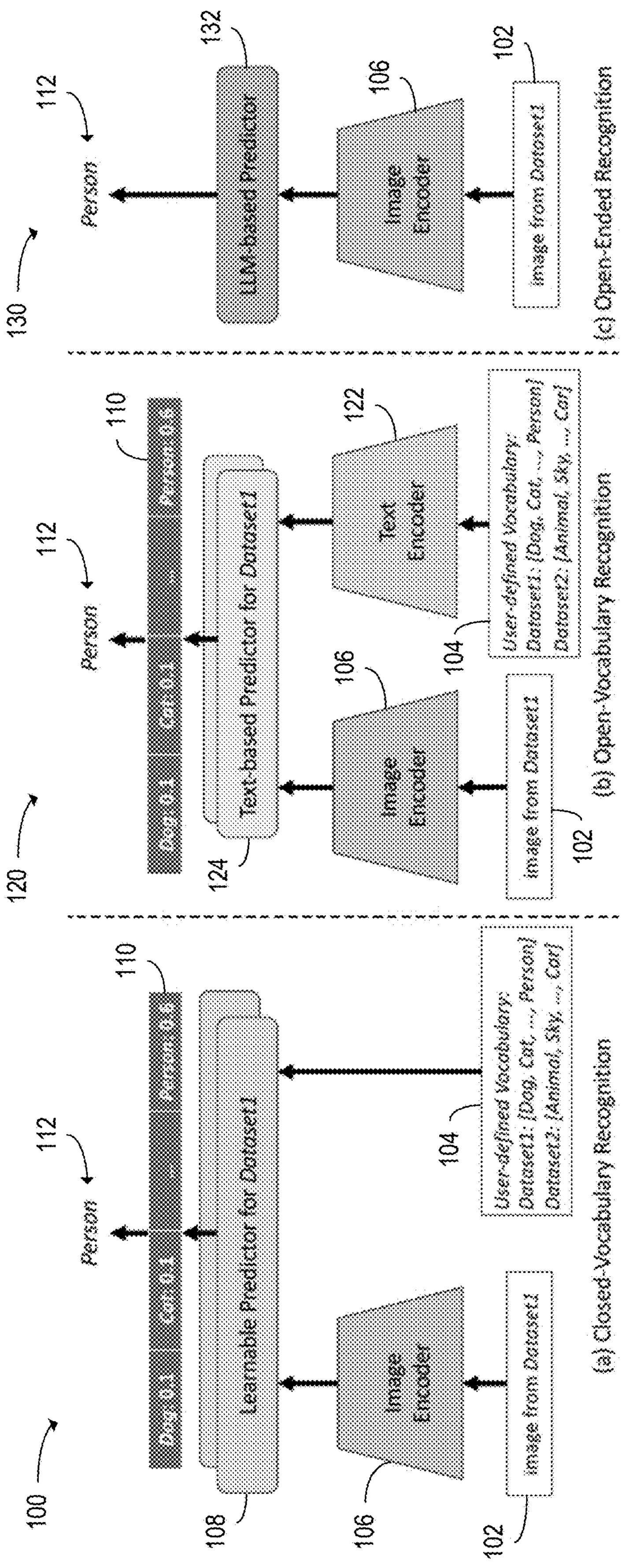
FIG. 2 schematically shows examples of a closed-vocabulary recognition setting, an open-vocabulary recognition setting, and an open-ended recognition setting, according to one example embodiment.

To address those challenges, a paradigm referred to as open-ended visual recognition is proposed herein. In this paradigm, the vocabulary C is assumed to remain unknown during both training and testing. This shift in perspective is illustrated in FIG. 2 for a holistic comparison of the different paradigms. FIG. 2 schematically shows examples of a closed-vocabulary recognition setting 100, an open-vocabulary recognition setting 120, and an open-ended recognition setting 130. In the closed-vocabulary recognition setting 100, the sets of semantic classes 104 that form a user-defined vocabulary are fixed during both training and testing. A learnable predictor 108 (e.g., 1×1 convolution layer) is used for each training dataset. The closed-vocabulary recognition setting 100 further makes use of an image encoder 106 that receives an image 102 and outputs encoded image data to the learnable predictor. The learnable predictor 108 that receives the encoded image data corresponds to the dataset from which the image 102 is drawn. The learnable predictor 108 outputs logits 110 from which a semantic label 112 is selected.

FIG. 2 further shows an open-vocabulary recognition setting 120. In the open-vocabulary recognition setting 120, the sets of semantic classes can be different during training and testing, allowing detection of novel concepts during testing by leveraging a pretrained vision transformer backbone (e.g., CLIP). An image encoder 106 receives the image 102 and a text encoder 122 receives the sets of semantic classes 104. The text-based predictor 124 (i.e., the text embeddings of the predefined set of semantic classes 104) is different for each dataset.

FIG. 2 further shows an open-ended recognition setting 130. In the open-ended recognition setting 130, an LLM-based predictor 132 directly predicts the class names 112 in a generative manner, removing the need to predefine the semantic classes 104 during training and testing. Additionally, the open-ended recognition setting 130 allows cross-dataset training to be performed more easily (e.g., with no need to involve humans to resolve label definition conflicts between datasets).

Rather than selecting a prediction class from a predefined vocabulary, the approach used in OSM involves directly predicting the class name of the target object. This direct prediction reformulates the recognition task as a text generation problem. Mathematically, open-ended recognition is framed as an endeavor to maximize the conditional likelihood of the class name under a forward autoregressive factorization:

$$p(c_i) = \prod_{j=0}^{N} p(c_{i,j} \mid c_{i,0}, \ldots , c_{i,j-1}), \quad (2)$$

where $c_{i,j}$ corresponds to the j-th text token within the class names for $c_i$.

3.2. Model Architecture

Figure 3A:
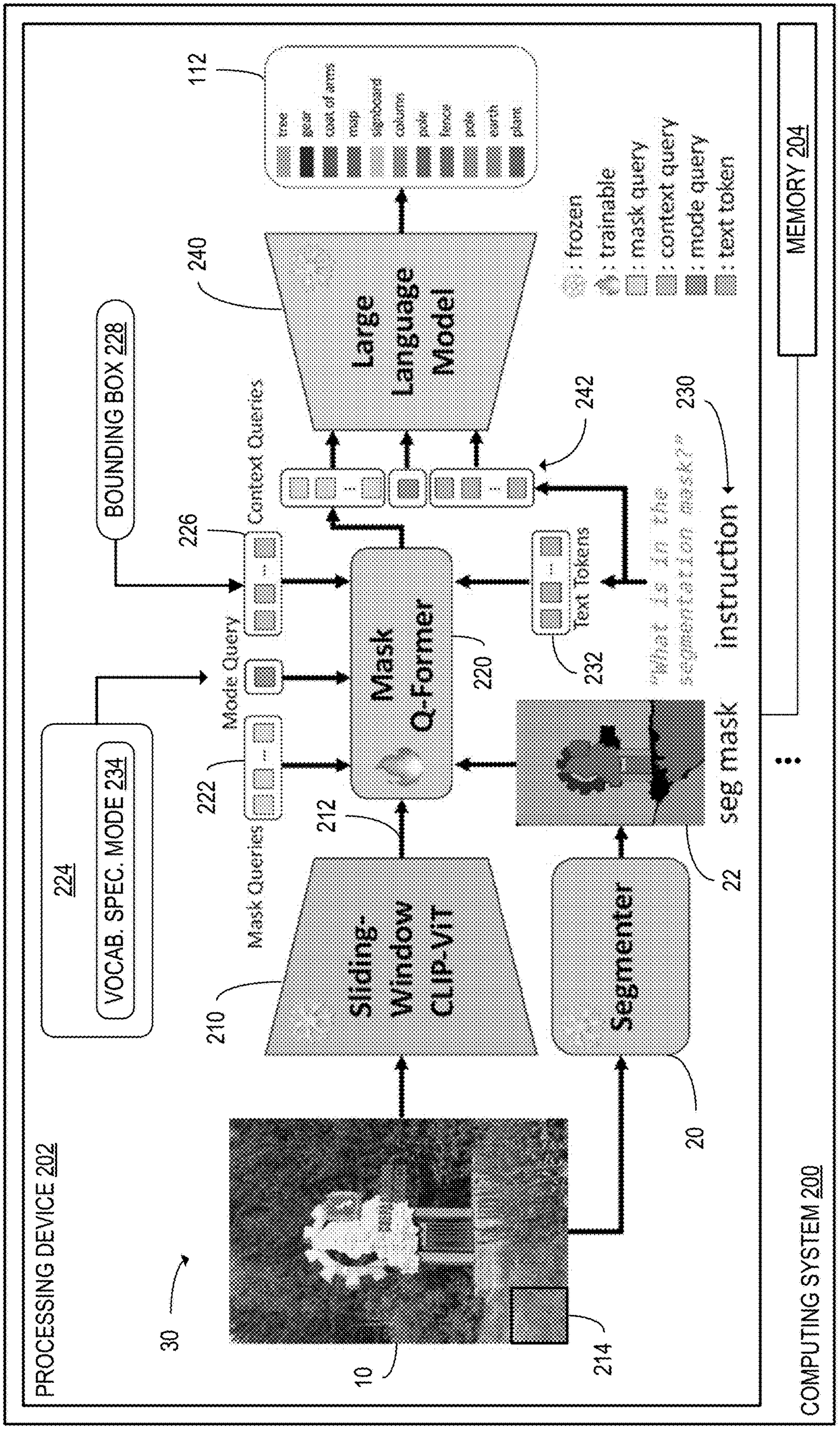
FIG. 3A schematically shows a computing system configured to execute a model, OmniScient Model (OSM), during inferencing time, according to the example of FIG. 1.
Figure 3B:
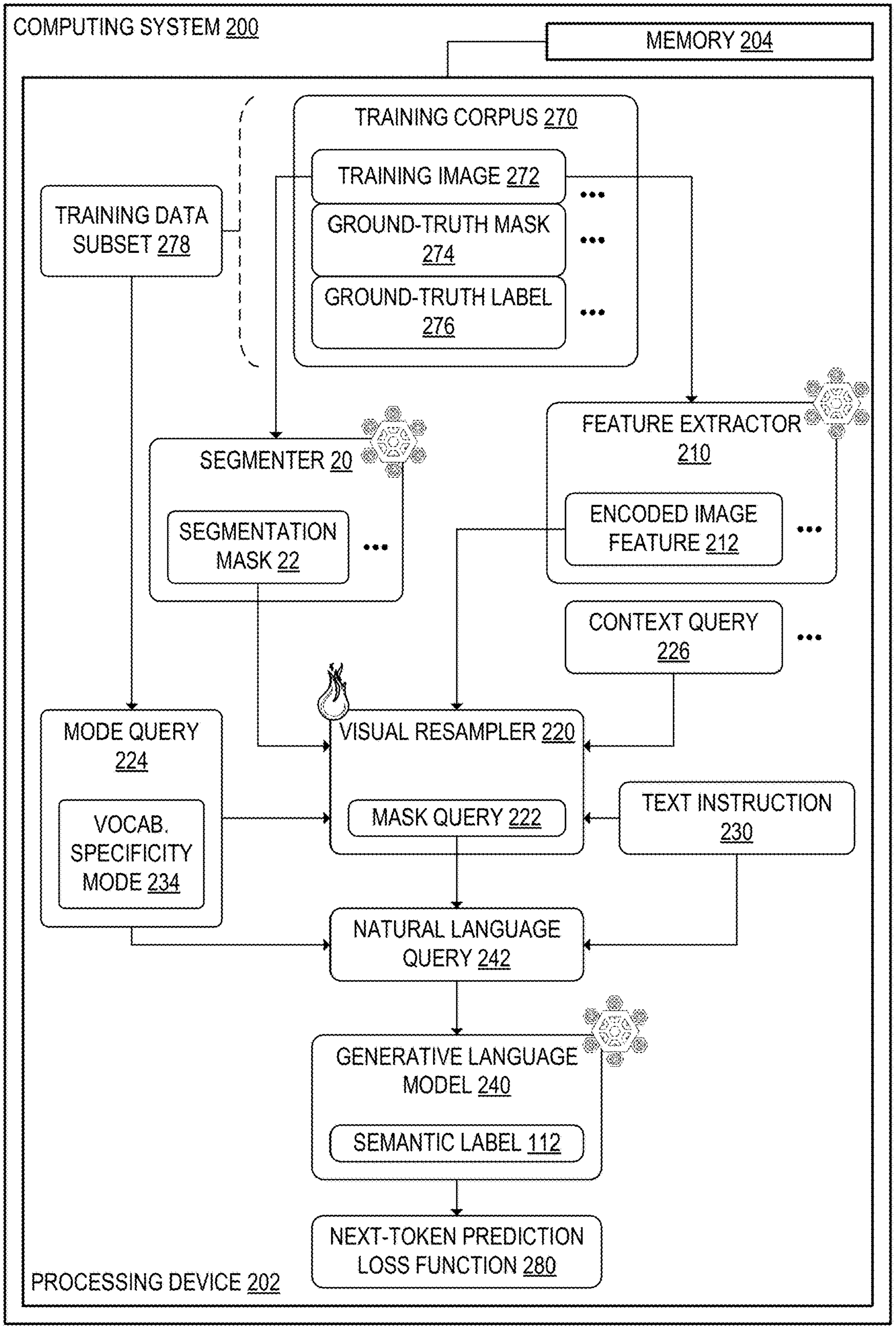
FIG. 3B schematically shows the computing system of FIG. 3A during training time when a visual resampler included in OSM is trained, according to one example.

The architectural overview of OSM 30 is presented in FIGS. 3A-3B, according to one example embodiment. OSM 30 is shown at inferencing time in FIG. 3A and at training time in FIG. 3B. OSM 30 is configured to be executed at a computing system 200 that includes one or more processing devices 202 and memory 204. In FIG. 3A, OSM 30 is depicted at inferencing time. OSM 30 includes three principal components: a frozen feature extractor 210 (e.g., open-vocabulary classifier such as a CLIP-ViT vision transformer), a trainable visual resampler 220 (e.g., a MaskQ-Former), and a frozen generative language model 240 (e.g., a Large Language Model (LLM)).

As shown in FIG. 3A, the one or more processing devices 202 are configured to receive an image 10. In addition, at a pretrained segmenter 20 (e.g., SAM), the one or more processing devices 202 are further configured to compute a segmentation mask 22 that identifies a region of interest included in the image 10. In some examples, as shown in FIG. 3A, the one or more processing devices 202 are configured to compute multiple different segmentation masks 22 corresponding to different regions of interest within the same image 10.

High-Resolution Feature Extraction with Frozen CLIP-ViT

At the feature extractor 210, the one or more processing devices 202 are further configured to compute a plurality of encoded image features 212 based at least in part on the image 10. For example, the encoded image features 212 may be pixel embeddings. As discussed above, the feature extractor 210 may be a CLIP-ViT vision transformer or some other open-vocabulary classifier.

A frozen vision transformer (ViT) backbone, pre-trained in the CLIP style, has become the standard choice in existing multi-modal LLM designs. The appeal of CLIP-ViT lies in its dual advantages: it provides a robust and adaptable feature representation for input images, and its feature space is well-suited for seamless conversion into language tokens, which the LLM can comprehend as inputs.

Nonetheless, the usage of CLIP-ViT, while successful in many multi-modal LLM applications such as image captioning and visual question answering, has its limitations. It was originally pre-trained on lower resolutions, typically at resolution 224×224. This lower resolution can hinder its performance, especially when tasked with object-level recognition. Moreover, previous research has observed that a frozen ViT exhibits weak generalization capabilities across varying input resolutions.

Despite the widespread use of frozen ViT backbones in multi-modal LLM models, it is evident that a 224×224 input resolution falls short, particularly for object-level recognition in larger images. Typical adaptations, such as windowed attention as seen in ViTDet, may not be applicable to a completely frozen ViT backbone. To address this limitation, the following strategy is introduced to extract more effective features using a frozen ViT at a higher resolution, for example, 896×896. Specifically, a sliding-window feature extraction approach is employed at the input level, where each window size matches that of the ViT's pre-trained image size. Thus, as shown in FIG. 3A, the one or more processing devices 202 are configured to compute the encoded image features 212 at least in part by sampling a plurality of windows 214 of the image 10. These windows 214 are spatial windows of image data included in the image 10. In such examples, the plurality of windows 214 each have a window size that is smaller than a total size of the image 10. These sampled windows 214 are used as inputs at the feature extractor 210. Afterwards, a global positional embedding is added to compensate for the missing location information across the windows 214. This strategy yields significantly improved performance in feature extraction compared to using high-resolution inputs.

MaskQ-Former

A visual resampler 220, such as a Q-Former or a Perceiver Resampler, is employed to bridge the gap between the encoded image features 212 and inputs suitable for the LLM 240. Thus, the term "visual resampler" as used herein refers to a machine learning model that converts image feature data into an LLM query. This visual resampler 220 may include a stack of transformer decoders that transform image tokens into a reduced set of query tokens, which are usually far fewer in number compared to image tokens. However, existing visual resamplers employ a set of queries that globally attend to image features without considering the segmentation mask priors.

In response to this limitation, a novel variant of the visual resampler 220 called MaskQ-Former is introduced. The MaskQ-Former takes a segmentation mask as input and performs masked cross-attention. At the MaskQ-Former visual resampler 220, the one or more processing devices 202 are further configured to compute a mask query 222 based at least in part on the segmentation mask 22, and the plurality of encoded image features 212. The mask query 222 includes a plurality of text tokens that the one or more processing devices 202 are configured to input into the generative language model 240.

The inputs to the MaskQ-Former visual resampler 220 further include a text instruction 230. The text instruction 230 is a natural-language input that is received at the one or more processing devices 202 in the form of a plurality of text tokens 232. The text instruction 230 instructs the visual resampler 220 to identify an object depicted in the region of interest delineated by the segmentation mask 22. In the example of FIG. 3A, the text instruction is "What is in the segmentation mask?". The visual resampler 220 is configured to generate the mask query 222 based at least in part on the text instruction 230 as well as on the segmentation mask 22 and the encoded image features 212.

In the example of FIG. 3A, the input to the MaskQ-Former includes two sets of learnable queries: the mask queries 222 and context queries 226. The mask queries 222 execute masked cross-attention, restricting their focus to the region of interest associated with the segmentation mask 22, while the context queries 226 attend to a broader region derived from the segmentation mask 22, such as the bounding box region, to provide complementary contextual information. The one or more processing devices 202 are further configured to compute a context query 226 associated with a bounding box 228 that surrounds the region of interest, and the visual resampler 220 is further configured to receive the context query 226 as input. This contextual information is used to make the object recognition more precise and unbiased by incorporating contextual information related to the area surrounding the region of interest.

Figure 4:
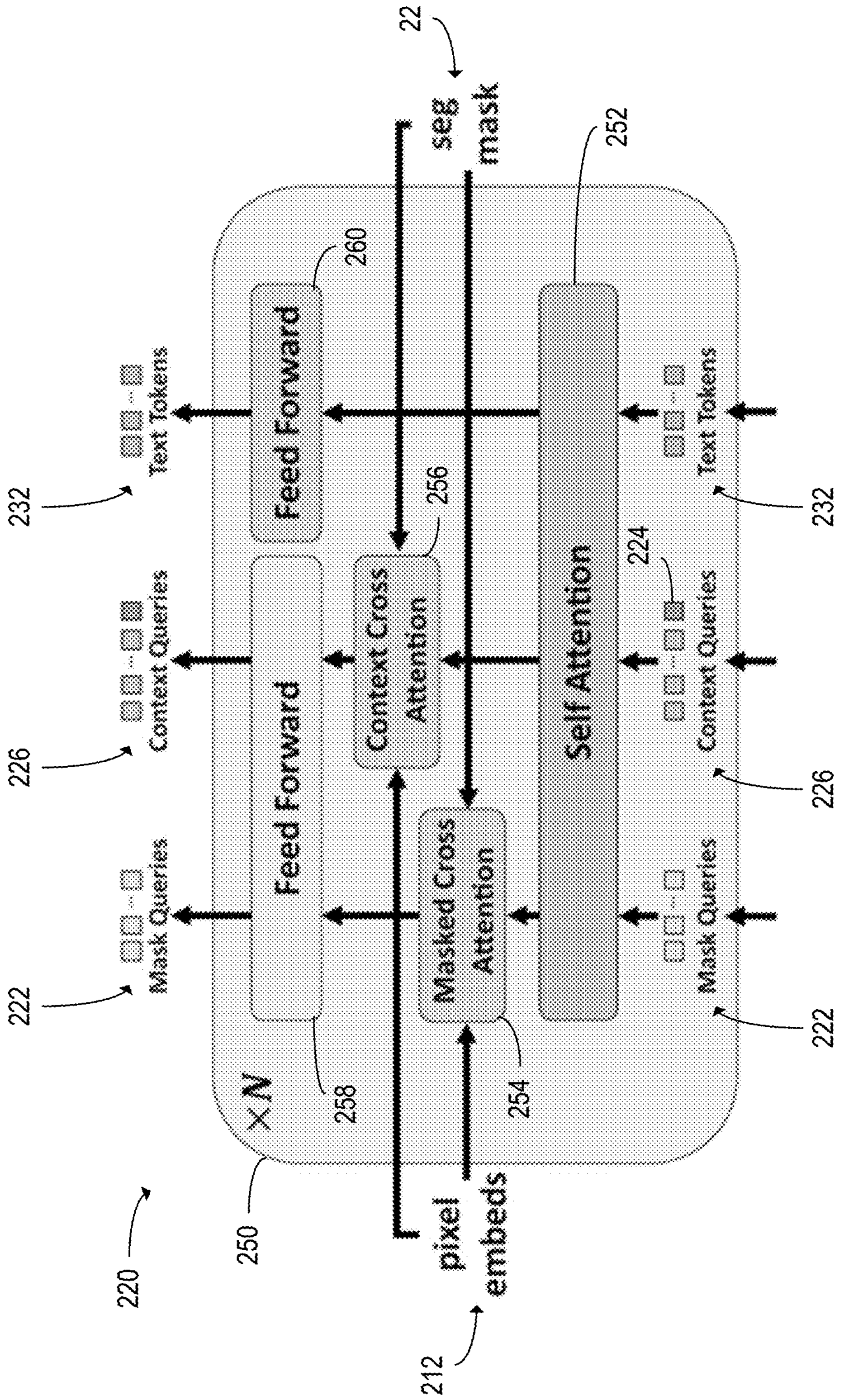
FIG. 4 schematically shows the architecture of the visual resampler in additional detail, according to the example of FIG. 3A.

FIG. 4 schematically shows the architecture of the MaskQ-Former visual resampler 220 in additional detail, according to one example. In the example of FIG. 4, the visual resampler 220 has a transformer architecture that includes a plurality of transformer layers 250. Each of the transformer layers 250 includes a self-attention layer 252, a masked cross-attention layer 254, a context cross-attention layer 256, a first feed-forward layer 258, and a second feed-forward layer 260. The self-attention layer 252 is configured to receive the mask query 222, the context query 226, and the text tokens 232 included in the text instruction 230.

The self-attention layer 252 is further configured to transmit its output vector to the masked cross-attention layer 254, the context cross-attention layer 256, and the second feed-forward layer 260. The masked cross-attention layer 254 and the context cross-attention layer 256 are further configured to receive the encoded image features 212 and the segmentation mask 22 as input. The masked cross-attention layer 254 and the context cross-attention layer 256 are further configured to transmit their respective output vectors to the first feed-forward layer 258.

The first feed-forward layer 258 is configured to recompute the mask query 222 and the context query 226 in response to receiving the output vectors of the masked cross-attention layer 254 and the context cross-attention layer 256. In addition, the second feed-forward layer 260 is configured to recompute the text tokens 232 in response to receiving the output of the self-attention layer 252. The recomputed mask query 222, context query 226, and text tokens 232 may be used as input to a subsequent transformer layer 250.

The parameters of the masked cross-attention layer 254 and the context cross-attention layer 256 may be shared. Moreover, mask queries 222 attend to the mask region in masked cross-attention layer 254, while context queries may attend to a larger region around the segmentation mask 22. The queries and tokens communicate with each other in the self-attention layer 252.

The MaskQ-Former summarizes the region of interest while retaining access to contextual content. Information exchange between the mask queries 222 and context queries 226 is facilitated through the self-attention layer 252. Parameters are shared between the mask queries 222 and context queries 226, except for a learnable query initialization, resulting in negligible additional costs. The mask query 222 output by the final transformer layer 250 is included in the input to the generative language model 240.

Mode Query

In some examples, as shown in FIG. 3A, a mode query 224 is used to align the outputs of the MaskQ-Former visual resampler 220 with a specific vocabulary. These mode queries 224 leverage the strong instruction-following capabilities of the LLM, thereby enhancing the adaptability of OSM 30 across diverse scenarios. Concretely, a dedicated learnable query is appended for each vocabulary to both the MaskQ-Former and LLM inputs. The visual resampler 220 is configured to receive a mode query 224 that indicates a vocabulary specificity mode 234, and to compute the mask query 222 based at least in part on the mode query 224. The mode query 224 may be appended to the context queries 226, as shown in the example of FIG. 4. The vocabulary specificity mode 234 may be a vocabulary-specific mode in which the mode query 224 includes a plurality of predefined classification labels. Alternatively, the vocabulary specificity mode 234 may be a vocabulary-agnostic mode in which the mode query 224 does not include predefined classification labels. Accordingly, the MaskQ-Former visual resampler 220 may be used with either an open-ended or closed-ended vocabulary.

Generative Language Model

The generative language model 240 is configured to receive a natural language query 242 that includes the mask query 222 and the text instruction 230. In the example of FIG. 3A, the natural language query 242 further includes the context query 226 and the mode query 224. Based at least in part on the natural language query, the generative language model 240 is further configured to generate a semantic label 112 associated with the region of interest for which the segmentation mask 22 was computed. Thus, the one or more processing devices 202 are configured to generate the semantic label 112 for the region of the image 10 corresponding to the segmentation mask 22.

3.3. Training and Evaluation Protocols

Datasets

FIG. 3B schematically shows OSM 30 during training, as discussed above. The visual resampler 220 is trained with a training corpus 270 including a plurality of training images 272. In addition, the training corpus 270 further includes a plurality of ground-truth masks 274 associated with respective training regions of interest within the training images 272. The training corpus 270 further includes a plurality of ground-truth labels 276 associated with the ground-truth masks 274.

In the experiments discussed below, to create a robust training and evaluation framework, six publicly available segmentation datasets were ensembled to form the training corpus 270. These segmentation datasets encompass diverse image distributions, domains, and segmentation tasks. These datasets include COCO panoptic segmentation, ADE20K panoptic segmentation, Cityscapes panoptic segmentation, LVIS instance segmentation, ADE-847 se-mantic segmentation, and PC-459 semantic segmentation.

Training Protocols

During training, the visual resampler 220 is trained via instruction tuning. This instruction tuning approach facilitates integration of the visual resampler 220 with the generative language model 240 during training. Specifically, for each training iteration, a training image 272 and its corresponding ground-truth mask 274 are randomly selected from the training corpus 270. In the experiments, an instruction template was randomly chosen, and the ground-truth label 276 was inserted into the instruction template. This approach allowed the visual resampler 220 to be trained using a next-token prediction loss function 280. The template "What is in the segmentation mask?" was used as a default template, and greedy search decoding was used during testing.

The choice of training batch size varied across datasets, with batch size 32 for COCO, 64 for LVIS, 16 for ADE-847, 8 for PC-459, 16 for ADE20K, and 8 for Cityscapes, respectively. In each training batch, half of the inputs activated vocabulary-specific queries corresponding to their respective datasets, while the other half activated vocabulary-agnostic queries. The AdamW optimizer was employed with a learning rate of $4\times10^{-5}$ and a weight decay of 0.05.

The learning rate followed a cosine decay schedule. Training was performed until the model had processed a total of 6 million masks.

Returning to FIG. 3B, in some examples, the training corpus 270 is a union of a plurality of training data subsets 278 in which the corresponding ground-truth labels 276 have different respective label spaces. The label space of a training data subset 278 is the set of all the different ground-truth labels 276 included in the training data subset 278. Thus, the label space defines the codomain of potential labels that may be assigned to the ground-truth masks 274 included in that training data subset 278. The one or more processing devices 202 are further configured to compute a plurality of mode queries 224 that are respectively associated with the training data subsets 278 and indicate the respective label spaces. The visual resampler 220 is further configured to receive the mode queries 224 during training in such examples.

During training, when utilizing datasets from various sources (which form training data subsets 278 of the training corpus 270), the corresponding vocabulary-specific query for each dataset is activated, allowing the visual resampler 220 to effectively "memorize" the associated vocabulary of each dataset, thereby improving alignment with that vocabulary during prediction. Additionally, in order to maintain open-ended recognition ability, a general vocabulary-agnostic query is included that is activated during training on each dataset. This approach provides flexibility during testing. A vocabulary-specific query can be activated to make the OSM's predictions align better with the desired vocabulary, or the vocabulary-agnostic query can be activated to facilitate open-ended predictions. This adaptability enhances OSM's utility across a spectrum of real-world scenarios, making it a versatile tool for a wide range of applications.

Evaluation Protocols

The model was evaluated on the validation set of each dataset, using two types of masks: 1) ground-truth masks 274 and 2) segmentation masks 22 produced by a pretrained segmenter 20. When using ground-truth masks 274 as inputs, predictions were considered correct only when the predicted class name exactly matched the class name in the ground-truth annotation. To enhance the reliability of this metric, the ground-truth class names were augmented with synonyms. Additionally, plural and singular formats of class names were considered. These synonyms were not used during model training, since they are not always semantically aligned (e.g., "person", "man", and "woman" are synonyms in COCO and LVIS). As a result, two metrics are reported: Accuracy (Acc) and Not-in-Vocabulary (NIV), which represent the percentages of predictions correctly match ground-truth classes, or the predictions do not fall into the dataset's vocabulary, respectively. The metric Acc directly evaluates the model's classification capacity, while NIV reflects the model's generalizability or degrees of overfitting to the training corpus 270.

Additionally, a more practical application was considered where OSM 30 was connected to a pretrained mask proposal model (e.g., kMaX-DeepLab or SAM). The model's performance was directly evaluated on the established academic benchmarks, including panoptic segmentation and semantic segmentation, using panoptic quality (PQ) and mean Intersection-over-Union (mIoU), respectively.

4. Experimental Results

In this section, the settings used for the ablation studies and the final model are provided. In Sec. 4.1, OSM is evaluated with ground-truth masks, and ablation studies are also performed. In Sec. 4.2, OSM is evaluated in a configuration in which a pretrained mask proposal model is used.

Default Settings for Ablations

Unless otherwise specified, the default setting below was used for ablation studies: both the image and mask were resized during training until the longer side reaches a length of 896 pixels, and the shorter side was padded to match this length. Minimal data augmentation was applied, limited to random flipping. The context queries in MaskQ-Former attended to the whole image. OSM was initialized with InstructBLIP pre-trained weights, which used EVA-ViT-g/224 as vision encoder, and Vicuna-7B as LLM. 32 mask queries, 32 context queries, and 1 mode query were used. The mode query was randomly selected between a vocabulary-agnostic query (shared across datasets) and a vocabulary-specific query (one per dataset).

Settings for Final Models

Based on the findings in the ablation studies (detailed in the results later), for the final model, the image resolution was increased to 1120 and the context queries attended to a bounding box region that was 0.5× larger than the box-constrained mask region. Random scale jittering was used in the range of [0.5, 1.5].

4.1. Mask Classification with Ground-Truth Masks

Generative Model for Discriminative Tasks

Table 1, shown in FIG. 5, illustrates mask classification accuracy across the six segmentation datasets, using ground-truth masks. OSM (vocab-agnostic) and OSM (vocab-specific) are obtained from the same model and weights but activate vocabulary-agnostic or vocabulary-specific queries during inference, respectively. NIV indicates Not-in-Vocabulary. The symbol † indicates the final model setting.

In Table 1, it is demonstrated that a generative model can effectively capture the training corpus 270, yielding predictions well-aligned with the training vocabulary. Specifically, as shown in the top few rows of the table ("Single Dataset"), OSM 30 was first trained separately on each of the six segmentation datasets, and its mask classification accuracy was evaluated using the ground-truth masks 274. Remarkably, the model, although tasked with unrestricted generation of class names, consistently delivers predictions well within the vocabulary of its respective training data subset 278. This consistency is evident from the high percentages of accurate predictions (i.e., high Acc scores) and the very low percentages of predictions falling outside the vocabulary (i.e., low NIV scores), showcasing the generative model's capacity to perform a discriminative task.

Next, an example is explored in which all six datasets are used for training ("Multiple Datasets" in the table). In this example, OSM 30 still maintained a high accuracy for each individual dataset, even in the presence of potential label conflicts. Specifically, the proposed Mode Query scheme effectively alleviated the label conflicts between datasets, where the vocabulary-specific queries ("vocab-specific" in the table) learned the associated vocabulary more accurately for each dataset, while the vocabulary-agnostic ("vocab-agnostic") maintained the open-ended recognition ability (indicated by higher NIV scores). These results underscore the value of the mode query 224.

Additionally, two discriminative baselines were established for comparisons. The first baseline (denoted as "Learnable Embed") replaced the frozen LLM with six learnable linear layers, each tailored to a specific dataset. The second baseline (named "Text Embed") initialized the classification layer with pre-extracted text embeddings and applied the classification layer individually to each dataset.

As shown in Table 1, the generative model OSM performs comparably to the "Learnable Embed" baseline on average (78.7% vs. 78.9% Acc) and outperforms the "Text Embed" baseline (which had 78.1% Acc). Accordingly, the generative model achieved similar accuracy to the discriminative models, even in discriminative tasks, under-scoring its versatility and effectiveness.

Finally, as shown in the last two rows of Table 1 (denoted as OSM †), using the final model settings (e.g., larger input size) can further significantly improve the performance for both vocabulary-agnostic and vocabulary-specific settings.

Adaptation to Higher Input Resolution

In contrast to many multi-modal LLM approaches that directly employ the frozen CLIP-ViT, higher input resolution allows more accurate object-level recognition to be achieved. However, the frozen ViTs often exhibit inferior performance when adapting to larger input resolutions compared to their pre-training resolutions. To address this limitation, the sliding-window approach discussed above is introduced to thereby obtain enhanced features from a frozen ViT when processing higher-resolution inputs.

FIG. 6 includes Tables 2A, 2B, 2C, and 2D that show the results of ablation studies on OSM. As illustrated in Table 2A, the experiments consistently demonstrate performance gains as input resolution increases, particularly from 224×224 to 448×448, reflecting an impressive improvement of +12.8% Acc. This underscores the role of a larger input resolution in achieving higher object-level recognition performance. The benefits persist until the input resolution reaches 1120×1120, while larger input resolution leads to a performance drop, potentially because each sliding-window fails to capture se-mantic meaningful feature. Notably, the "Avg NIV" metric remains relatively stable across all experiments, indicating that the performance boost primarily stems from improved mask classification rather than a better overfitting with the respective vocabulary.

Sliding-Window Stride

The sliding-window design is validated in Table 2B, where direct application of the frozen ViT with high-resolution inputs ("Global") results in significantly reduced performance (−7.2% Acc). Moreover, Table 2B reveals that employing the sliding-window approach with overlapping windows further enhances results, although the incremental benefit diminishes as the overlap increases. Considering the significant additional computational costs associated with using overlapping windows, they were not used in the final settings.

Effects of Mode Query

Table 2C shows the effects of the mode query 224 on performance. As demonstrated in Table 2C, training OSM 30 across multiple datasets without the mode query 224 may result in better generalization capabilities but compromised alignment to specific datasets. These effects are evident from a lower "Avg Acc" and a higher "Avg NIV". However, with the integration of the mode query, OSM 30 exhibited the ability to operate in both "closed-ended" mode (vocabulary-specific) and "open-ended" mode (vocabulary-agnostic). This allows OSM 30 to strike a balance between generalization and alignment, preserving both essential capabilities.

Context is Important for Recognition

Table 2D shows the effects of context enlargement on performance. Here, "Global" signifies that the context attention encompasses the entire image, whereas "0.0×" refers to a tightly con-strained bounding box that encircles the segmentation mask closely. The notation "k×" indicates the expansion of the bounding box by a factor of "k×" on each side. The results in the table underscore the significance of context. Even a tightly defined bounding box offered a noteworthy improvement over global context (+0.8%). Notably, transitioning to a looser bounding box progressively enhanced the benefits, with the most substantial gain occurring at "0.5×" (+2.6%) compared to the global context configuration.

4.2. Mask Classification with Pretrained Mask Proposal Model Benchmarking with Other Generalists In addition to evaluating OSM 30 with ground-truth masks 274, a practical assessment is provided by integrating OSM 30 with a pretrained mask proposal model. Mask proposals generated by kMaX-DeepLab were employed, and OSM 30 was applied to classify these mask proposals. Comparisons with other generalist segmentation models that are jointly trained with multiple segmentation datasets, similar to the current setting, are also provided. Specifically, text embedding-based methods like LMSeg and DaTaSeg were compared across various datasets, including COCO panoptic, ADE20K panoptic and semantic, Cityscapes panoptic, and semantic segmentation. The results of these comparisons are shown in Table 3, which is provided in FIG. 7. As outlined in Table 3, OSM consistently achieved higher Panoptic Quality (PQ) and mean Intersection-over-Union (mIoU) scores compared to discriminative methods. Specifically, with an R-50 proposal model backbone, OSM 30 outperformed LMSeg by +14.7, +8.4, and +4.7 PQ on COCO, ADE20K, and Cityscapes respectively. Compared to DaTaSeg, OSM also improved the COCO PQ by +4.3, +2.6 and the ADE20K mIoU by +1.9, +1.2 for R50 and Large backbone variants, respectively. OSM 30 also shows comparable performance to the specialist model Mask2Former.

5. Conclusions

In the above discussion, the task of open-ended visual recognition is introduced. OSM, a generative framework, is provided in order to address this challenge. OSM processes segmentation masks as inputs and generates semantic class predictions in a generative manner, without requiring those semantic class predictions to be restricted to a predefined vocabulary. The experiments performed with OSM reveal that this generative model yields promising recognition accuracy and exhibits significant potential for real-world applications, particularly in handling novel concepts that extend beyond predefined vocabularies.

Supplementary Material

In the supplementary materials, more technical details of OSM are provided. Furthermore, more visualizations and comparisons with a multimodal LLM are included. Moreover, it is shown that OSM can be easily extended with part-level and box-level datasets, further unleashing the potential of OSM.

Instruction Template

The instruction templates used for OSM training are summarized in Table 4, which is shown in FIG. 8. During training, one instruction template was randomly selected the ground-truth class name was inserted. Only the first template, "What is in the segmentation mask?" was used during testing.

Tradeoff between Accuracy and Generalization

Figure 9:
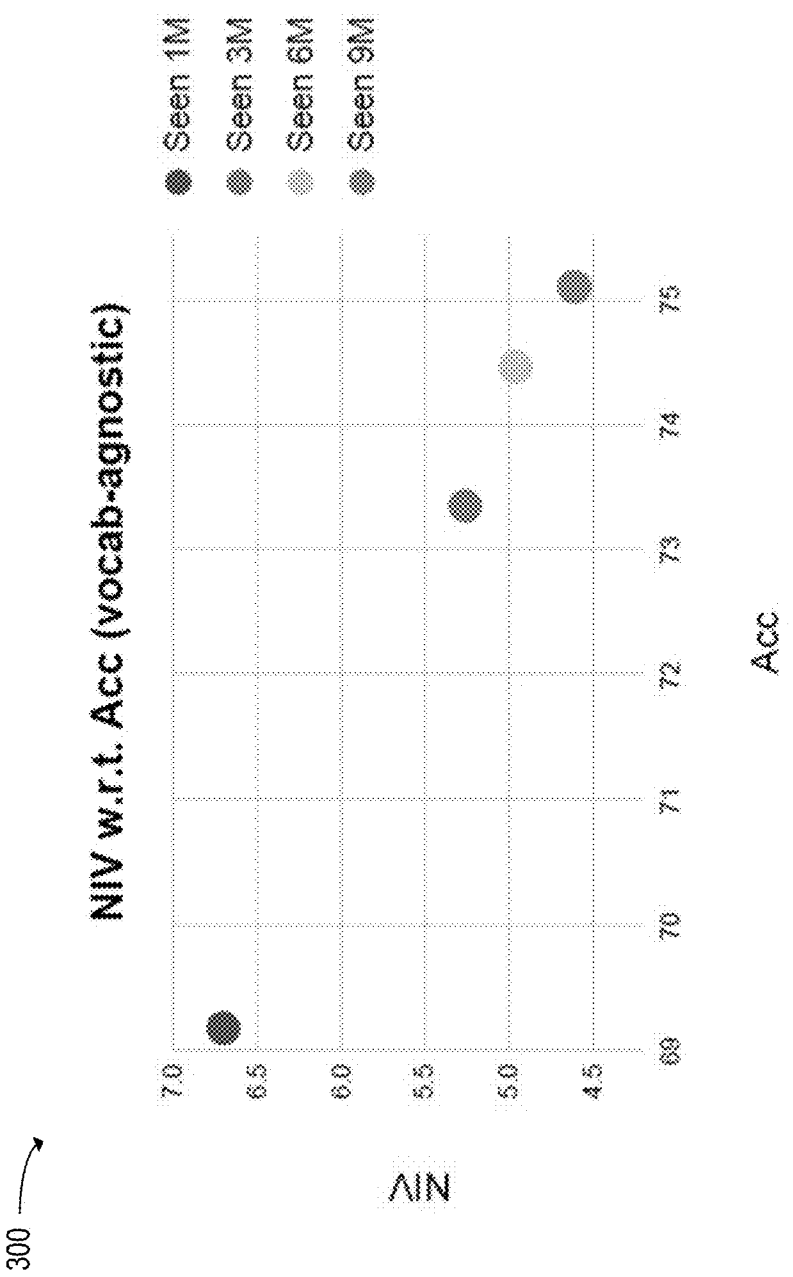
FIG. 9 shows a plot of the NIV and accuracy of OSM with different numbers of training masks, according to the example of FIG. 3B.

OSM was trained under different observed number of masks (i.e., 1, 3, 6, 9 million, respectively). FIG. 9 shows a plot 300 of the NIV and Acc of OSM with these different numbers of training masks. Empirically, Acc is treated as a metric of how well the model can accurately recognize the object. NIV is treated as a metric of the generalization ability of the model. The plot 300 shows a tradeoff between accuracy and generalization, such that when the number of observed masks increases, the model achieves higher accuracy while having increased overfitting to the training vocabulary and predicting in a more conservative manner. From 6 M to 9 M, the accuracy improvement primarily comes from the decrease in NIV.

Incorporating Part- and Box-level Datasets

OSM seamlessly accommodates part-level and box-level datasets, further enhancing its versatility. To enhance OSM for part-level and box-level recognition (note that OSM already shows emergent part recognition ability as illustrated in FIG. 1, but introducing such datasets could further advance its part recognition capabilities), PartImageNet, Pascal-Part, and V3Det datasets are introduced into the training data. For part data, the object name is prepended to part name, in case multiple parts share the same names (e.g., in PartImageNet, many different classes may have the same part named "head"). Furthermore, class names that are too vague (e.g., train left side, bus upper side in Pascal-Part) are removed.

For detection data, the bounding-box is considered as a box-shaped binary mask and thus is easily unified into OSM. Additionally, the panoptic/instance segmentation data (e.g., COCO, LVIS) is augmented by randomly converting each segmentation mask into its corresponding bounding box. In cases where a bounding box serves as input, the text instruction is appropriately adjusted by replacing the term "segmentation mask" with "bounding box." Image-level data (e.g., ImageNet) is not included at this stage, as the semantic label could introduce bias when multiple objects share a single label.

Figure 10:
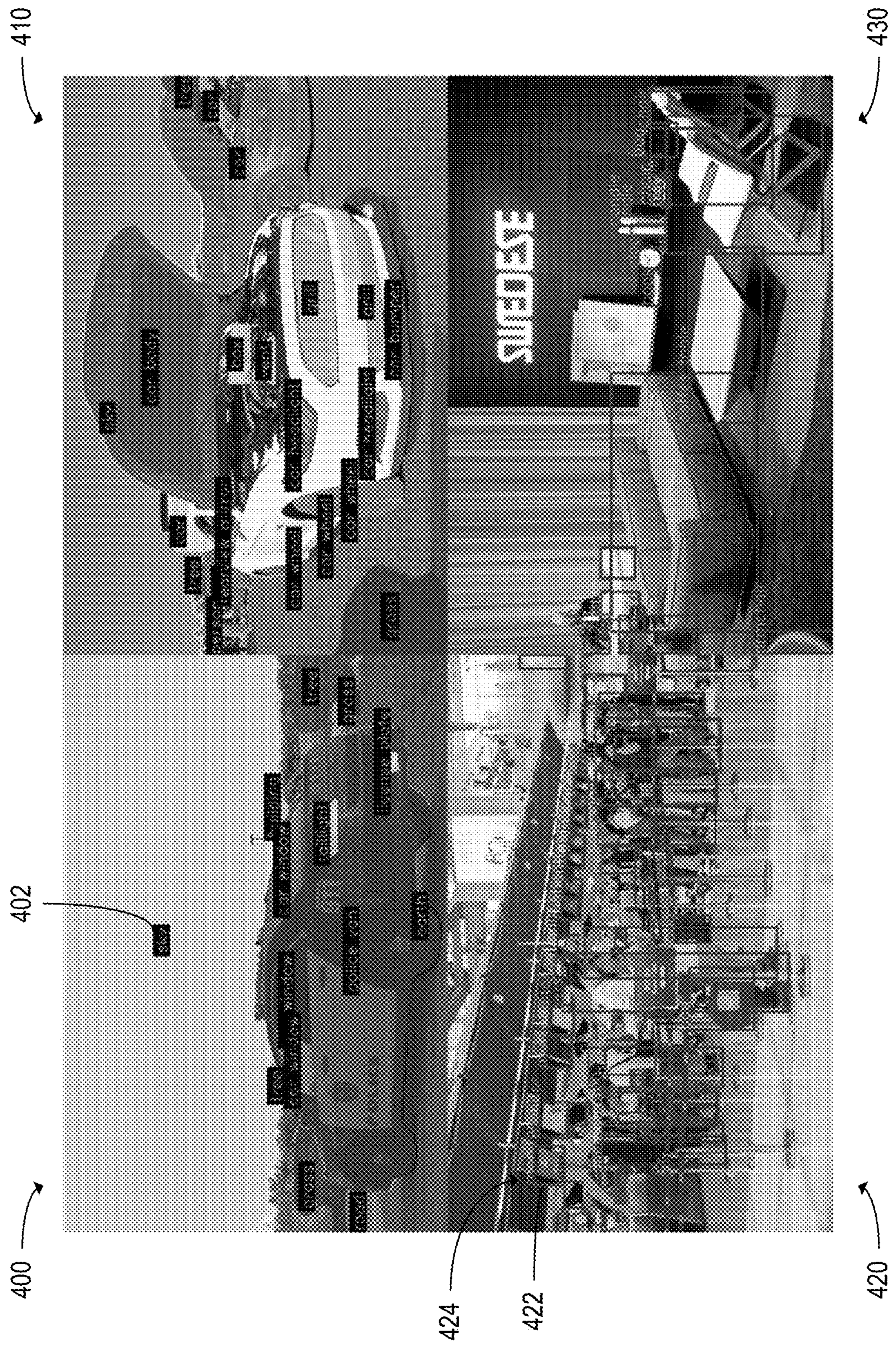
FIG. 10 shows example images that are labeled with part-level and box-level data, according to the example of FIG. 3A.

FIG. 10 shows example images that are labeled with part-level and box-level data. In the example of FIG. 10, SAM and DETA are respectively used as the proposal model. FIG. 10 depicts a first image 400 and a second image 410 that are each labeled with part-level data. A plurality of part-level labels 402 are shown within the first image 400 and the second image 410. In addition, FIG. 10 depicts a third image 420 and a fourth image 430 that are labeled with box-level data. A plurality of bounding boxes 422 and corresponding box-level labels 424 are depicted in the third image 420 and the fourth image 430.

Qualitative Results

Figure 11A:
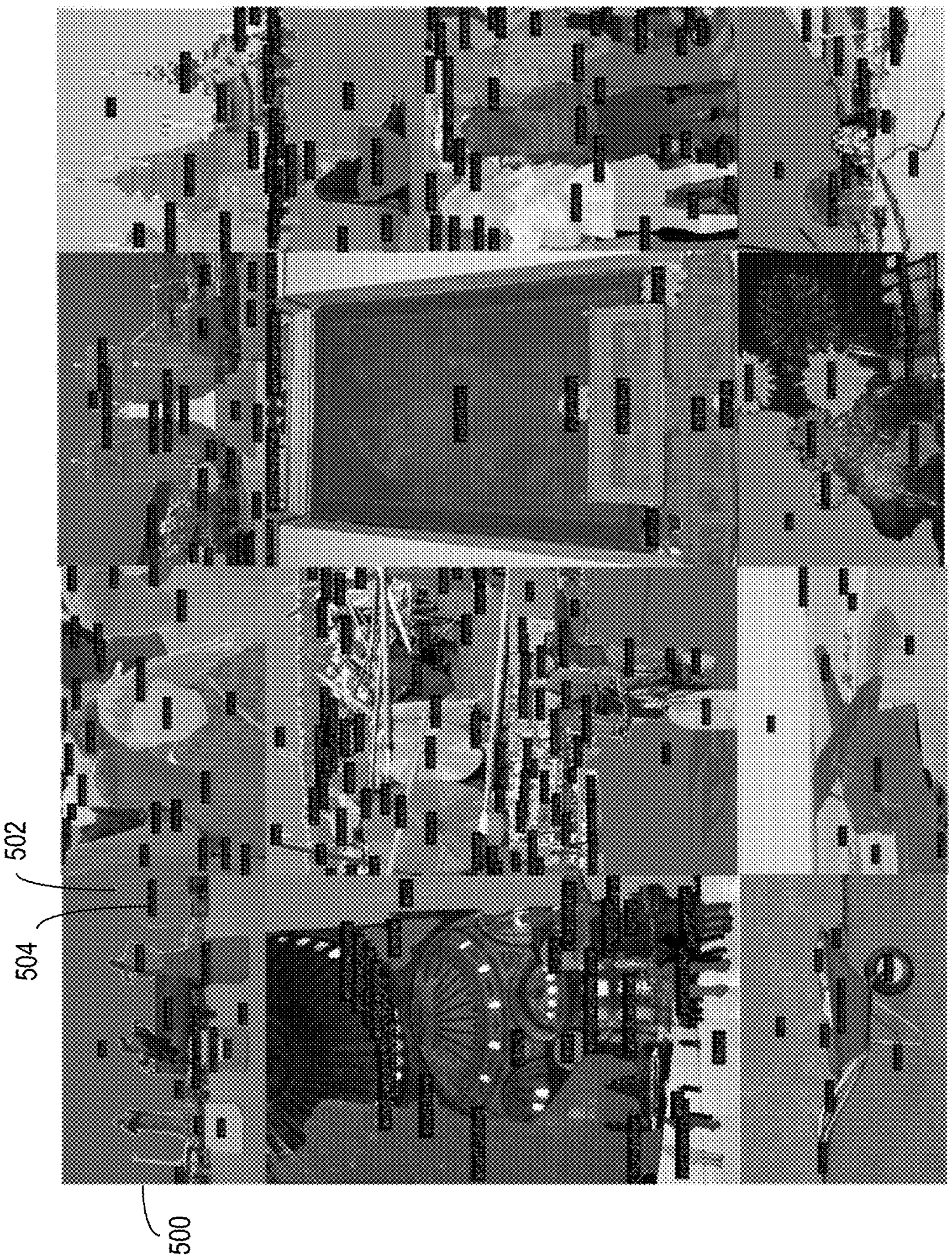
FIG. 11A shows example images, along with corresponding segmentation masks and semantic labels generated for those images using SAM as a segmenter, according to the example of FIG. 3A.
Figure 11B:
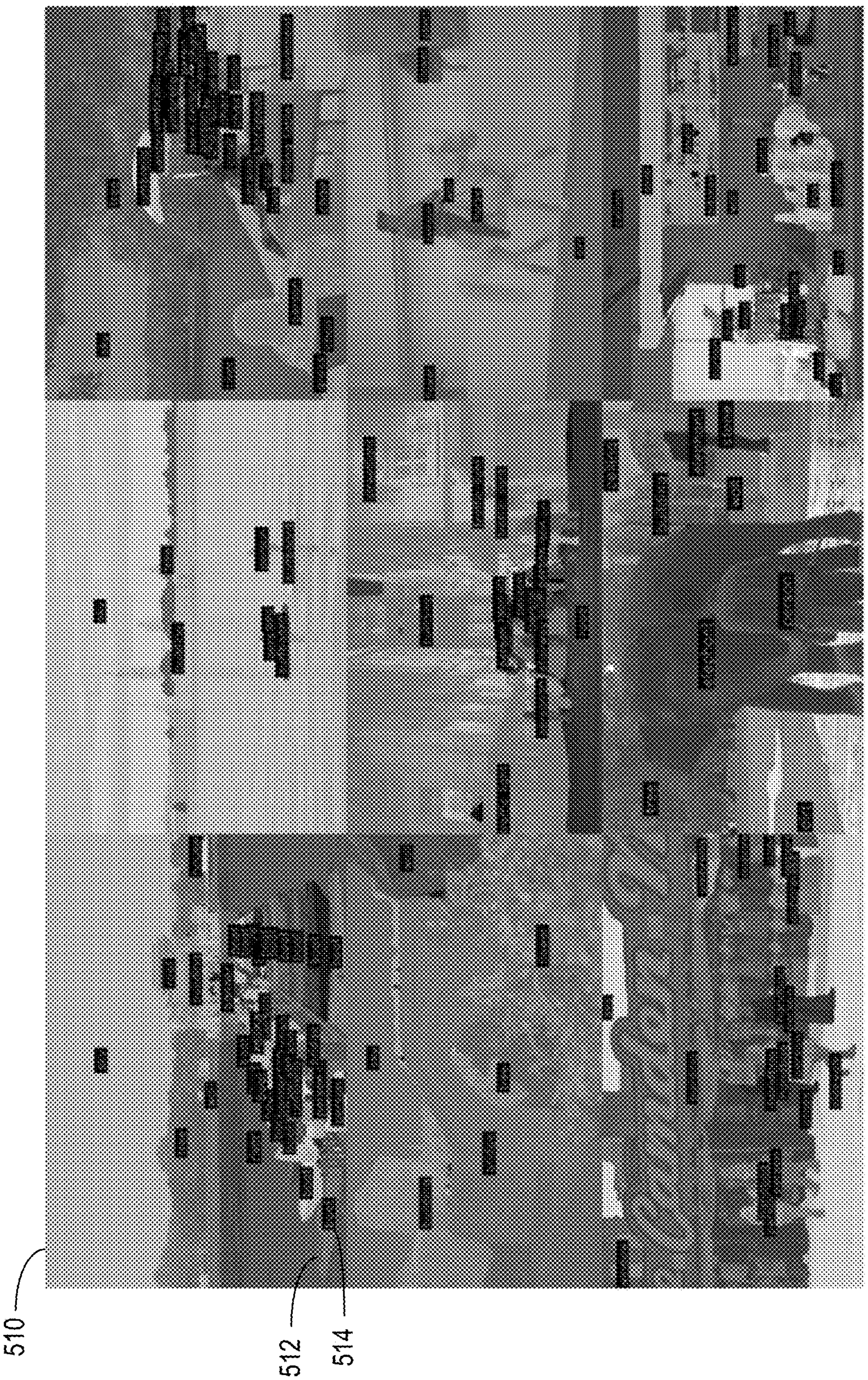
FIG. 11B shows example images, along with corresponding segmentation masks and semantic labels generated for those images using kMaX-DeepLab as a segmenter, according to the example of FIG. 3A.

Qualitative results are provided in FIGS. 11A-11B when OSM was used with SAM and kMaX-DeepLab, respectively, as the segmenter. These results demonstrate the capabilities of OSM in practical scenarios when performing open-ended recognition with fine-grained masks. FIG. 11A shows example images 500, along with corresponding segmentation masks 502 and semantic labels 504 that were generated for those images 500 when SAM was used as the segmenter. When obtaining mask proposals from SAM, the SAM variant had a ViT-H backbone, 32 points per side, an IoU threshold of 0.95, a stability threshold of 0.95, and a minimum mask size of 800. These settings avoid outputting large numbers of small masks that are not recognizable (e.g., super-pixel level masks).

FIG. 11B shows example images 510, along with corresponding segmentation masks 512 and semantic labels 514 that were generated for those images 510 when kMaX-DeepLab was used as the segmenter. When obtaining mask proposals from kMaX-DeepLab, a model trained on the COCO Panoptic dataset with the ConvNeXt-L backbone was used, and the "thing" and "stuff" thresholds were set to 0.1. Mask-wise post-processing was applied to the outputs of OSM after OSM had processed the mask proposals.

Comparison Against Multimodal LLM

Figure 12:
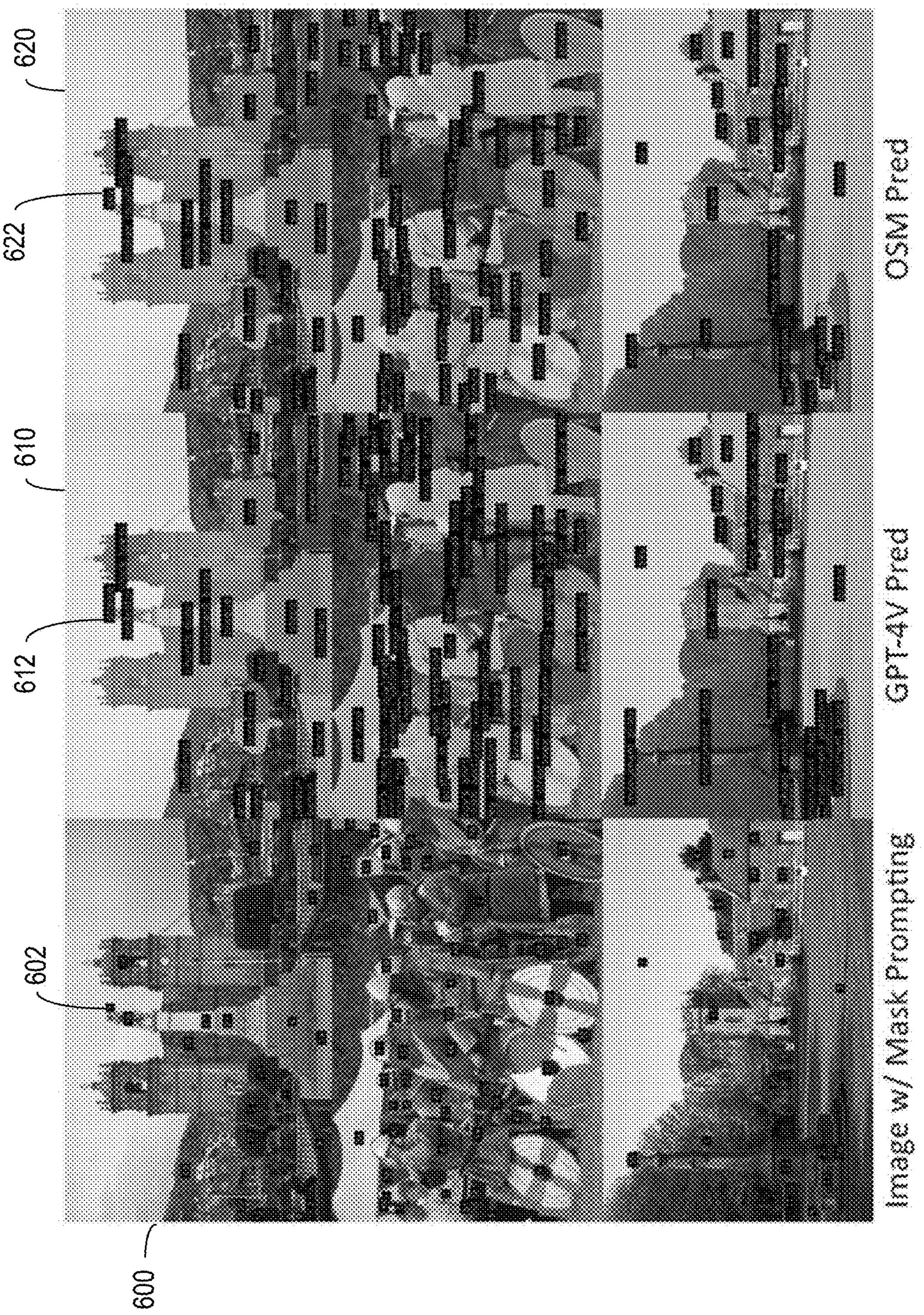
FIG. 12 shows example labeled images that provide a qualitative comparison between a multimodal large language model and OSM, according to the example of FIG. 3A.

A qualitative comparison between a multimodal LLM and OSM is provided below, as shown in the example of FIG. 12. The multimodal LLM was prompted for mask recognition. In FIG. 12, the mask boundaries are highlighted as auxiliary cues in the example images 600, and each mask center is annotated with a numeric ID 602. Each prompted image 600 was fed to the multimodal LLM, along with text prompt "I have labeled a bright numeric ID at the center for each visual object in the image. Please enumerate their names (i.e., semantic class) with one, two, or three words.".

Results of semantic labeling with the multimodal LLM and OSM are further shown in FIG. 12. In FIG. 12, a first column of images 600 shows the images after performing mask prompting and inputting the masked images into the multimodal LLM. A second column shows multimodal LLM-labeled images 610 in which semantic labels predicted by the multimodal LLM are depicted at the corresponding regions of interest. A third column shows OSM-labeled images 620 in which the semantic labels 622 computed with OSM are shown at the regions of interest.

It is observed from the results shown in FIG. 12 that OSM has a more accurate prediction compared to the multimodal LLM (e.g., in the first row, OSM correctly predicted masks 5 and 11 as "bench" and "fence," while the multimodal LLM wrongly predicted them both as "streetlight"), which was often confused by the context (e.g., in the first row, for the mask 10, the multimodal LLM predicts "buildings" instead of "mountain," potentially due to confusion from the buildings below). However, OSM's prediction was more conservative compared to that of the multimodal LLM, which can predict a more specific word. For example, in the second row, the multimodal LLM predicted "man in armor" for the man in the image, while OSM predicted in a safer way with "person."

The approach used to generate the labeled images shown in FIG. 12 was also used to compare OSM to state-of-the-art open-sourced multi-modal LLMs. However, the open-sourced multi-modal LLMs failed to generate reasonable outputs.

Evaluation with Open-Vocabulary Benchmarks

OSM is also evaluated against state-of-the-art open-vocabulary labeling methods in Table 5, as shown in FIG. 13. To provide an open-vocabulary setting (i.e., a setting in which the target datasets were never seen during training), OSM was trained with COCO and LVIS data only and evaluated on ADE20K dataset in a zero-shot manner. During testing, OSM's predictions were mapped to a target vocabulary using text embedding similarity between predicted class names and target vocabulary class names. A geometric ensemble was also applied to enhance the labeling results with the frozen CLIP predictions. The results are reported in Table 5 with and without the geometric ensemble, where the results with the geometric ensemble are indicated with asterisks. As shown in Table 5, when not using the geometric ensemble method, OSM shows higher PQ, AP, and mIoU scores compared to state-of-the-art open-vocabulary methods. When using the geometric ensemble from another frozen CLIP, OSM still shows a comparable performance with other state-of-the-art methods, such as ODISE and FC-CLIP.

Visualization of NIV Cases

Figure 14A:
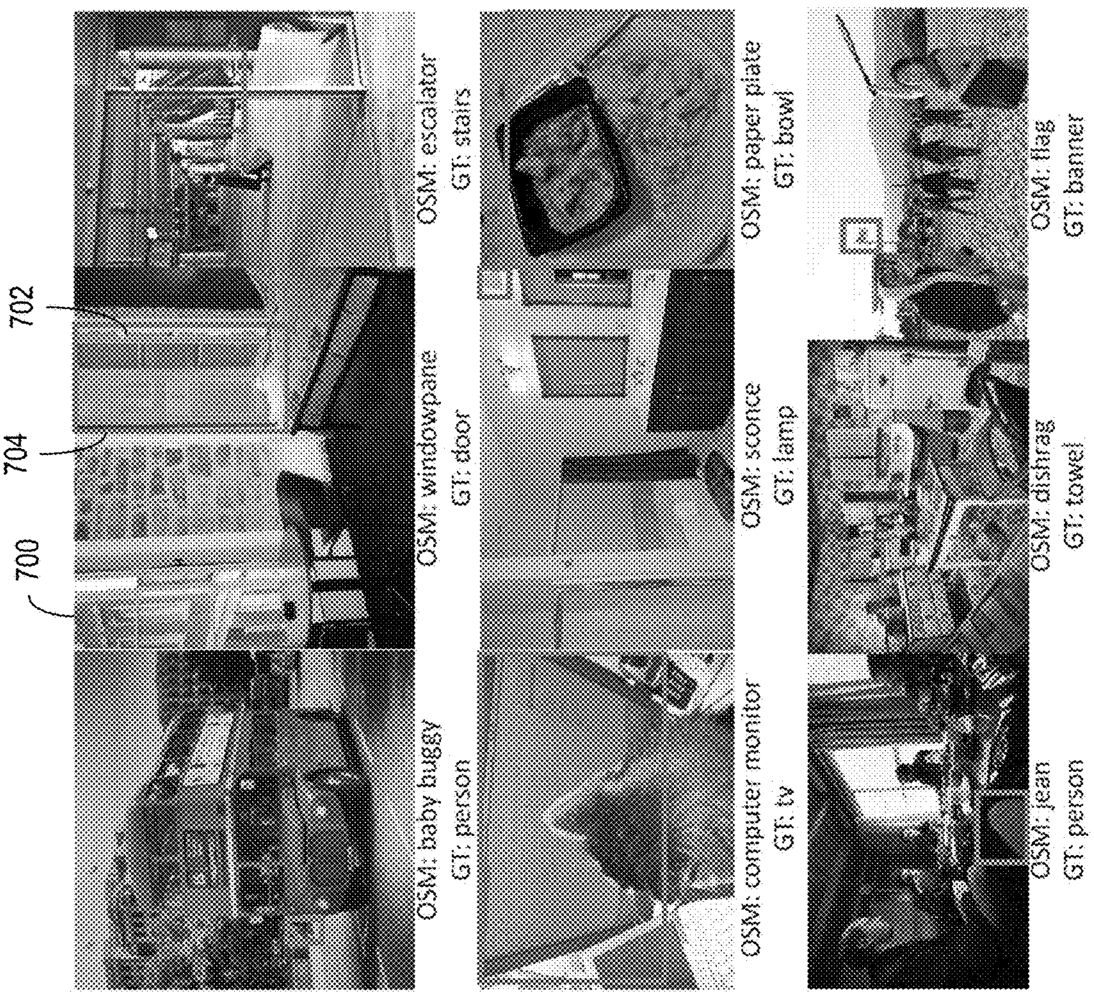
FIGS. 14A-14B show examples in which OSM assigns NIV labels to images, according to the example of FIG. 3A.
Figure 14B:
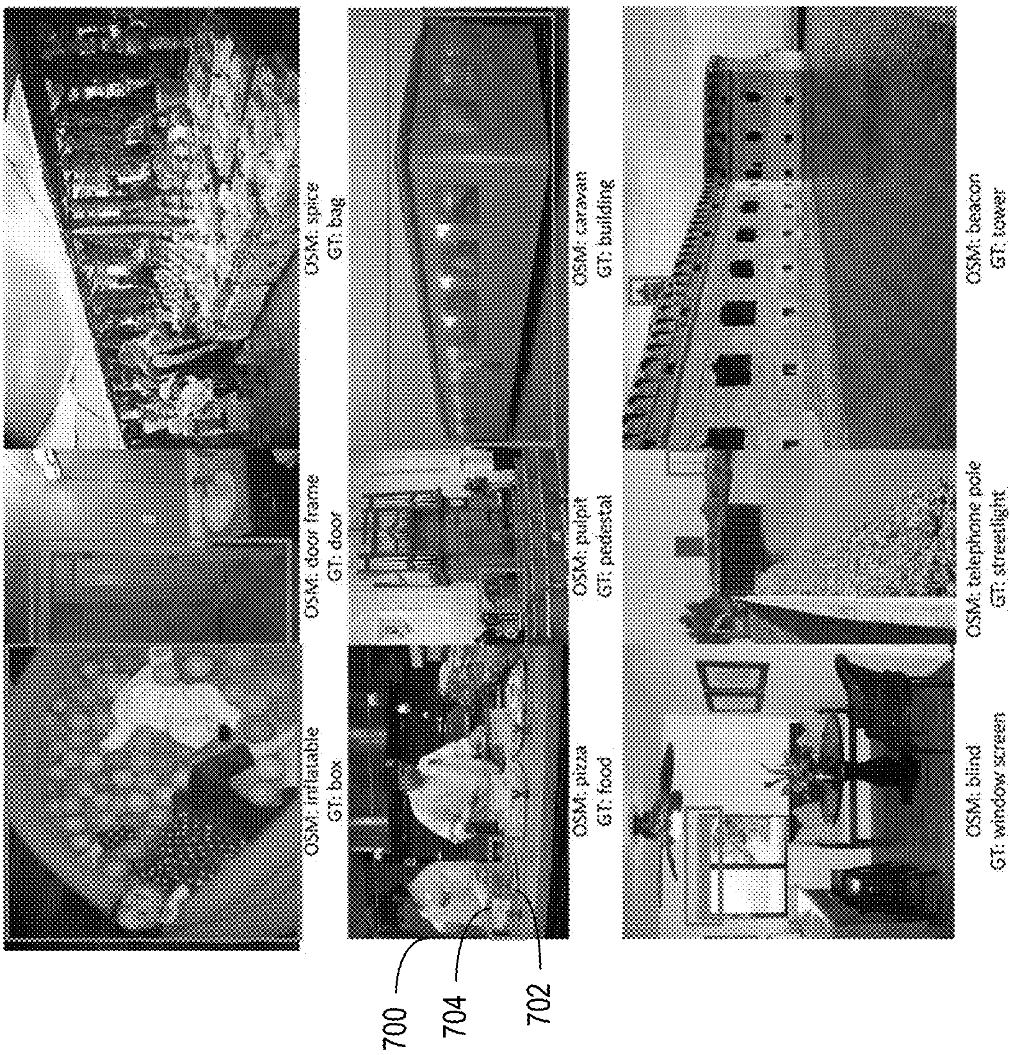

In order to demonstrate the NIV (Not-in-Vocabulary) cases discussed above, NIV cases are depicted in FIGS. 14A-14B. These NIV cases are shown by comparing ground-truth masks to ground-truth annotations for a COCO val set and an ADE20K val set in FIGS. 14A and 14B, respectively. In the examples of FIGS. 14A-14B, example images 700 are shown with corresponding segmentation masks 702 and bounding boxes 704 highlighted.

With a pre-defined vocabulary, even the ground-truth annotations are usually biased and limited, where annotators have to pick a most similar class in the given vocabulary (e.g., all monitors are labeled as "tv" in COCO). These biases may be learned and inherited in existing closed-vocabulary and open-vocabulary models. However, OSM can predict a more appropriate class name without being limited to a given vocabulary, thereby demonstrating the effectiveness of getting rid of a pre-defined vocabulary and pursuing open-ended visual recognition.

Figure 15A:
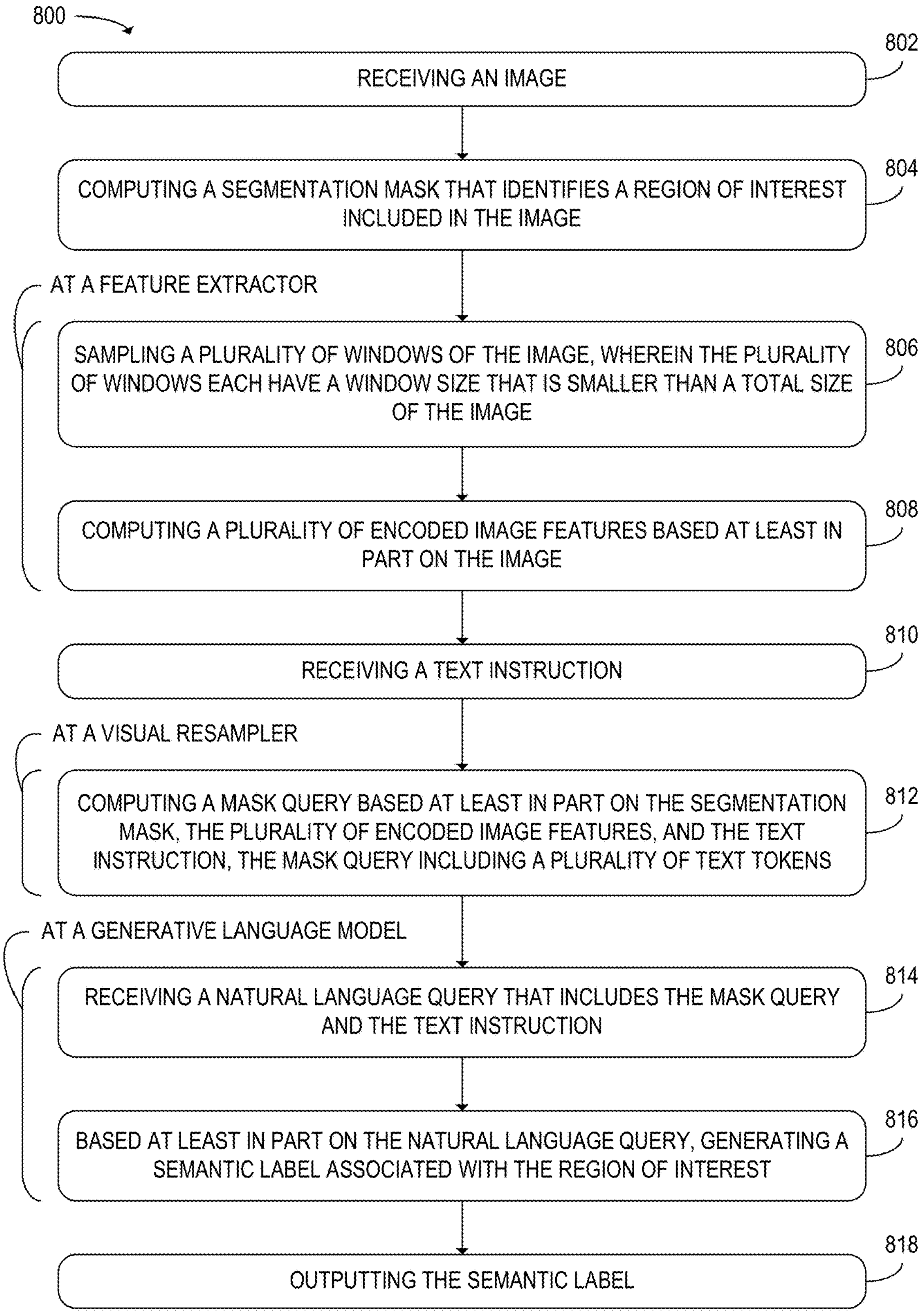
FIG. 15A schematically shows a flowchart of a method for use with a computing system to assign a semantic label to an image, according to the example of FIG. 3A.

FIG. 15A schematically shows a flowchart of a method 800 for use with a computing system to assign a semantic label to an image. For example, the method 800 may be performed at the one or more processing devices 202 included in the computing system 200 of FIGS. 3A-3B.

At step 802, the method 800 includes receiving an image. At step 804, the method 800 further includes computing a segmentation mask that identifies a region of interest included in the image. The segmentation mask may be computed at a pretrained segmenter (e.g., SAM or kMaX-DeepLab).

In some examples, at step 806, the method 800 further includes sampling a plurality of windows of the image. The windows may be sampled at a feature extractor. In such examples, the plurality of windows each have a window size that is smaller than a total size of the image. For example, windows that each have a 224×224 size may be sampled from a higher-resolution image. In some examples in which step 806 is performed, overlapping windows are sampled from the image.

At step 808, the method 800 further includes computing a plurality of encoded image features based at least in part on the image. The encoded image features may be pixel embeddings. Step 808 may also be performed at the feature extractor. In examples in which step 806 is performed, the feature extractor is configured to receive the windows as inputs. The feature extractor may be an open-vocabulary classifier such as CLIP-ViT.

At step 810, the method 800 further includes receiving a text instruction, which includes a plurality of text tokens.

At step 812, the method 800 further includes computing a mask query. The mask query is computed based at least in part on the segmentation mask, the plurality of encoded image features, and the text instruction, the mask query including a plurality of text tokens. The mask query may be computed at a visual resampler. In some examples in which the mask query is computed at the visual resampler, the inputs to the visual resampler may further include a mode query and/or a context query. The visual resampler may have a transformer architecture that includes a plurality of transformer layers. In such examples, each of the transformer layers may include a self-attention layer, a masked cross-attention layer, a context cross-attention layer, a first feed-forward layer, and a second feed-forward layer.

Steps 814 and 816 of the method 800 may be performed at a generative language model, which may be an LLM. At step 814, the method 800 further includes receiving a natural language query that includes the mask query and the text instruction. The natural language query may further include the mode query in examples in which a mode query is used. At step 816, the method 800 further includes generating a semantic label associated with the region of interest based at least in part on the natural language query.

At step 818, the method 800 further includes outputting the semantic label. For example, the semantic label may be output to a graphical user interface (GUI) at which the semantic label is displayed. The image and the region of interest may also be displayed at the GUI in such examples.

Figure 15B:
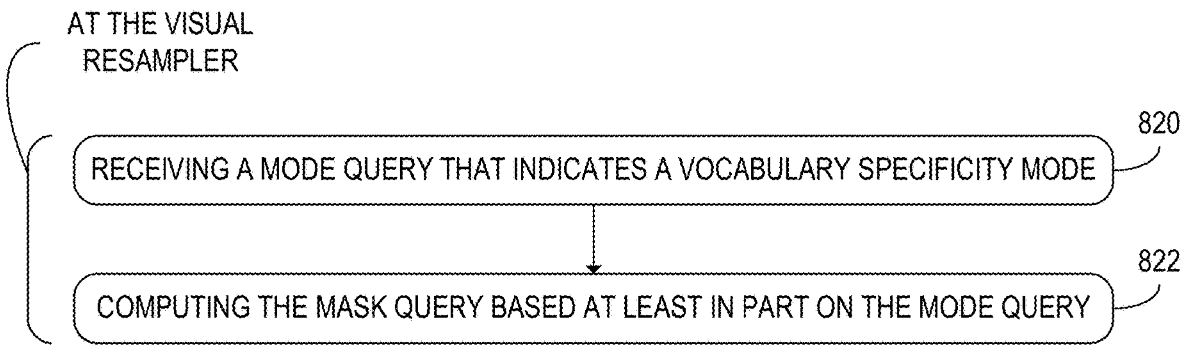
FIGS. 15B-15D show additional steps of the method of FIG. 15A that may be performed in some examples.
Figure 15C:
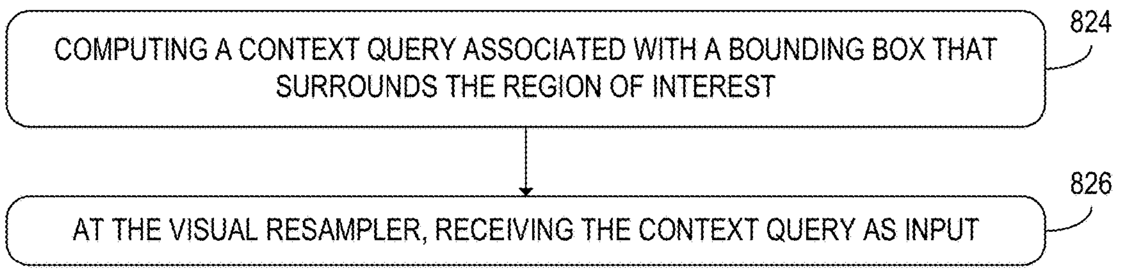
Figure 15D:
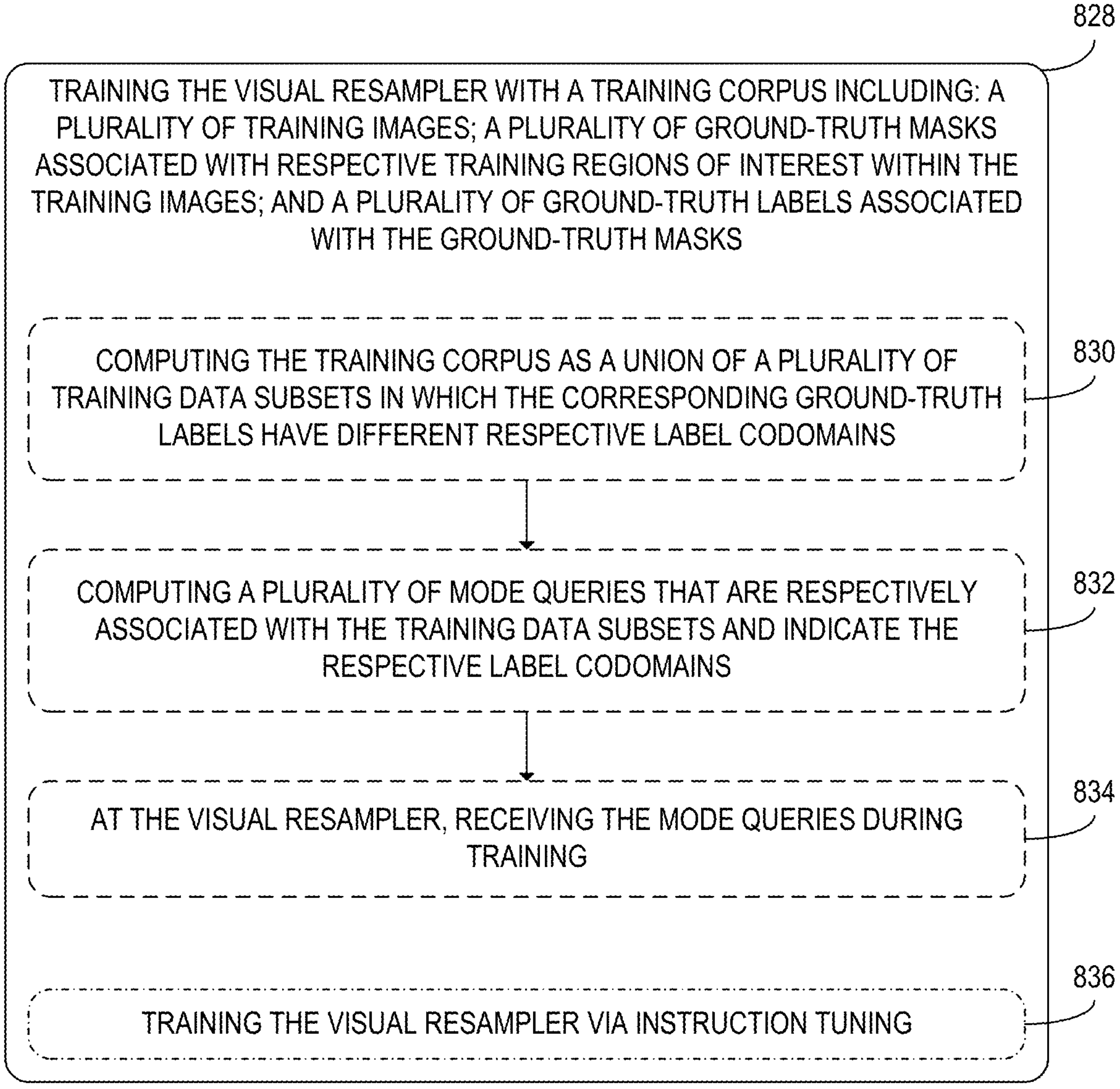

FIGS. 15B-15D show additional steps of the method 800 that may be performed in some examples. The steps of FIG. 15B may be performed at the visual resampler. At step 820, as shown in FIG. 15B, the method 800 may further include receiving a mode query that indicates a vocabulary specificity mode. The vocabulary specificity mode is a vocabulary-specific mode in which the mode query includes a plurality of predefined classification labels or a vocabulary-agnostic mode in which the mode query does not include predefined classification labels. The mode query may be a text input including a plurality of text tokens. At step 822, the method 800 may further include computing the mask query based at least in part on the mode query. Thus, the visual resampler may be switchable between vocabulary-specific and vocabulary-agnostic modes.

FIG. 15C shows additional steps of the method 800 that may be performed when a context query is used. At step 824, the method 800 may further include computing a context query. The context query is associated with a bounding box that surrounds the region of interest. At step 826, the method 800 may further include receiving the context query as input at the visual resampler. The context query may be iteratively recomputed at each of a plurality of layers of the visual resampler. Image data in the region within the bounding box may accordingly be used to provide additional context with which the visual resampler computes the mask query.

FIG. 15D shows additional steps of the method 800 that may be performed when training the visual resampler prior to performing step 802. At step 828, the method 800 may further include raining the visual resampler with a training corpus that includes a plurality of training images. The training corpus may further include a plurality of ground-truth masks associated with respective training regions of interest within the training images. In addition, the training corpus may further include a plurality of ground-truth labels associated with the ground-truth masks.

Training the visual resampler at step 828 may include performing steps 830, 832, and 834 in examples in which the steps of FIG. 15B are performed. In such examples, at step 830, step 828 may include computing the training corpus as a union of a plurality of training data subsets in which the corresponding ground-truth labels have different respective label spaces. At step 832, step 828 may further include computing a plurality of mode queries that are respectively associated with the training data subsets and indicate the respective label spaces. At step 834, step 828 may further include receiving the mode queries as input at the visual resampler during training.

Additionally or alternatively to steps 830, 832, and 834, step 828 may include step 836 in some examples. At step 828, step 828 may include training the visual resampler via instruction tuning.

In some embodiments, the methods and processes described herein may be tied to a computing system of one or more computing devices. In particular, such methods and processes may be implemented as a computer-application program or service, an application-programming interface (API), a library, and/or other computer-program product.

Figure 16:
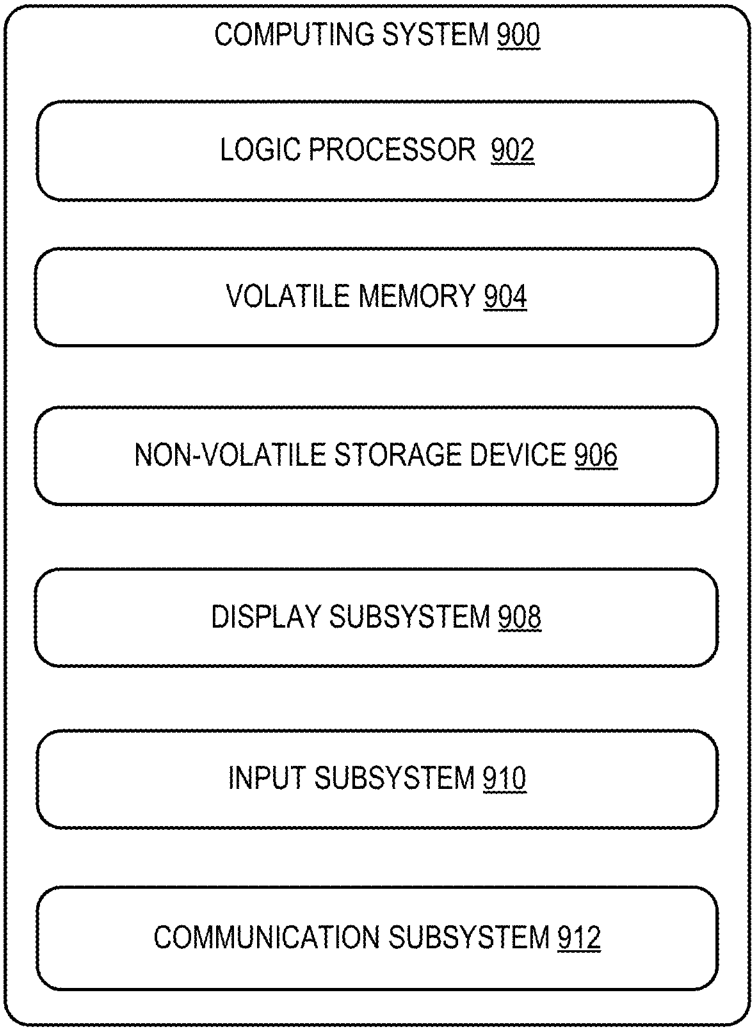
FIG. 16 shows a schematic view of an example computing environment in which the computing system of FIGS. 3A-3B may be instantiated.

FIG. 16 schematically shows a non-limiting embodiment of a computing system 900 that can enact one or more of the methods and processes described above. Computing system 900 is shown in simplified form. Computing system 900 may embody the computing system 200 described above and illustrated in FIGS. 3A-3B. Computing system 900 may take the form of one or more personal computers, server computers, tablet computers, home-entertainment computers, network computing devices, video game devices, mobile computing devices, mobile communication devices (e.g., smart phone), and/or other computing devices, and wearable computing devices such as smart wristwatches and head mounted augmented reality devices.

Computing system 900 includes a logic processor 902 volatile memory 904, and a non-volatile storage device 906. Computing system 900 may optionally include a display subsystem 908, input subsystem 910, communication subsystem 912, and/or other components not shown in FIG. 16.

Logic processor 902 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors 9 configured to execute software instructions. Additionally or alternatively, the logic processor may include one or more hardware logic circuits or firmware devices configured to execute hardware-implemented logic or firmware instructions. Processors of the logic processor 902 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 906 includes one or more physical devices configured to hold instructions executable by the logic processors to implement the methods and processes described herein. When such methods and processes are implemented, the state of non-volatile storage device 906 may be transformed—e.g., to hold different data.

Non-volatile storage device 906 may include physical devices that are removable and/or built-in. Non-volatile storage device 906 may include optical memory, semiconductor memory, and/or magnetic memory, or other mass storage device technology. Non-volatile storage device 906 may include nonvolatile, dynamic, static, read/write, read-only, sequential-access, location-addressable, file-addressable, and/or content-addressable devices. It will be appreciated that non-volatile storage device 906 is configured to hold instructions even when power is cut to the non-volatile storage device 906.

Volatile memory 904 may include physical devices that include random access memory. Volatile memory 904 is typically utilized by logic processor 902 to temporarily store information during processing of software instructions. It will be appreciated that volatile memory 904 typically does not continue to store instructions when power is cut to the volatile memory 904.

Aspects of logic processor 902, volatile memory 904, and non-volatile storage device 906 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 typically implemented in software by a processor to perform a particular function using portions of volatile memory, which function involves transformative processing that specially configures the processor to perform the function. Thus, a module, program, or engine may be instantiated via logic processor 902 executing instructions held by non-volatile storage device 906, using portions of volatile memory 904. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 908 may be used to present a visual representation of data held by non-volatile storage device 906. The visual representation may take the form of a graphical user interface (GUI). As the herein described methods and processes change the data held by the non-volatile storage device, and thus transform the state of the non-volatile storage device, the state of display subsystem 908 may likewise be transformed to visually represent changes in the underlying data. Display subsystem 908 may include one or more display devices utilizing virtually any type of technology. Such display devices may be combined with logic processor 902, volatile memory 904, and/or non-volatile storage device 906 in a shared enclosure, or such display devices may be peripheral display devices.

When included, input subsystem 910 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 912 may be configured to communicatively couple various computing devices described herein with each other, and with other devices. Communication subsystem 912 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 900 to send and/or receive messages to and/or from other devices via a network such as the Internet.

The following paragraphs provide additional description of the subject matter of the present disclosure. According to one aspect of the present disclosure, a computing system is provided, including one or more processing devices configured to receive an image. The one or more processing devices are further configured to compute a segmentation mask that identifies a region of interest included in the image. At a feature extractor, the one or more processing devices are further configured to compute a plurality of encoded image features based at least in part on the image. The one or more processing devices are further configured to receive a text instruction. At a visual resampler, the one or more processing devices are further configured to compute a mask query based at least in part on the segmentation mask, the plurality of encoded image features, and the text instruction, the mask query including a plurality of text tokens. At a generative language model, the one or more processing devices are further configured to receive a natural language query that includes the mask query and the text instruction. At the generative language model, based at least in part on the natural language query, the one or more processing devices are further configured to generate a semantic label associated with the region of interest. The one or more processing devices are further configured to output the semantic label. The above features may have the technical effect of labeling a region of interest in the image in a generative manner that allows for increased variety among labels, while also maintaining consistency in the level of specificity of the labels.

According to this aspect, the visual resampler may be further configured to receive a mode query that indicates a vocabulary specificity mode. The visual resampler may be further configured to compute the mask query based at least in part on the mode query. The above features may have the technical effect of giving the visual resampler a runtime-customizable level of vocabulary specificity.

According to this aspect, the natural language query may further include the mode query. The above feature may have the technical effect of providing the level of vocabulary specificity to the generative language model when the semantic label is generated.

According to this aspect, the vocabulary specificity mode may be a vocabulary-specific mode in which the mode query includes a plurality of predefined classification labels, or a vocabulary-agnostic mode in which the mode query does not include predefined classification labels. The above features may have the technical effect of allowing a user to define a set of predefined classification labels from which the semantic label is selected, or alternatively to not limit the semantic label to a member of a predefined set.

According to this aspect, the one or more processing devices may be configured to compute the encoded image features at least in part by sampling a plurality of windows of the image. The plurality of windows may each have a window size that is smaller than a total size of the image. The above features may have the technical effect of allowing a pretrained feature extractor to be used even when the image has a different size from the input size of the pretrained feature extractor.

According to this aspect, the one or more processing devices may be further configured to compute a context query associated with a bounding box that surrounds the region of interest. The visual resampler may be further configured to receive the context query as input. The above features may have the technical effect of incorporating contextual information from a region of the image surrounding the region of interest when the visual resampler computes the mask query.

According to this aspect, the visual resampler may have a transformer architecture that includes a plurality of transformer layers, each of which includes a self-attention layer, a masked cross-attention layer, a context cross-attention layer, a first feed-forward layer, and a second feed-forward layer. The above features may have the technical effect of allowing the visual resampler to summarize the region of interest while retaining access to contextual content.

According to this aspect, the visual resampler may be trained with a training corpus including a plurality of training images. The training corpus may further include a plurality of ground-truth masks associated with respective training regions of interest within the training images. The training corpus may further include a plurality of ground-truth labels associated with the ground-truth masks. The above features may have the technical effect of training the visual resampler to generate mask queries in a manner that matches the distribution of the training corpus.

According to this aspect, the visual resampler may be trained via instruction tuning. The above feature may have the technical effect of facilitating integration of the visual resampler with the generative language model during training.

According to this aspect, the training corpus is a union of a plurality of training data subsets in which the corresponding ground-truth labels have different respective label spaces. The one or more processing devices may be further configured to compute a plurality of mode queries that are respectively associated with the training data subsets and indicate the respective label spaces. The visual resampler may be further configured to receive the mode queries during training. The above features may have the technical effect of training the visual resampler to recognize multiple different sets of predefined classification labels when used in the vocabulary-specific mode at runtime.

According to another aspect of the present disclosure, a method for image processing is provided. The method includes receiving an image and computing a segmentation mask that identifies a region of interest included in the image. The method further includes computing a plurality of encoded image features based at least in part on the image. The method further includes receiving a text instruction. The method further includes computing a mask query based at least in part on the segmentation mask, the plurality of encoded image features, and the text instruction, the mask query including a plurality of text tokens. The method further includes receiving a natural language query that includes the mask query and the text instruction. Based at least in part on the natural language query, the method further includes generating a semantic label associated with the region of interest. The method further includes outputting the semantic label. The above features may have the technical effect of labeling a region of interest in the image in a generative manner that allows for increased variety among labels, while also maintaining consistency in the level of specificity of the labels.

According to this aspect, the method may further include receiving a mode query that indicates a vocabulary specificity mode. The method may further include computing the mask query based at least in part on the mode query. The above features may have the technical effect of giving the visual resampler a runtime-customizable level of vocabulary specificity.

According to this aspect, the natural language query may further include the mode query. The vocabulary specificity mode may be a vocabulary-specific mode in which the mode query includes a plurality of predefined classification labels, or a vocabulary-agnostic mode in which the mode query does not include predefined classification labels. The above features may have the technical effect of providing the level of vocabulary specificity to the generative language model when the semantic label is generated. The above features may further have the technical effect of allowing a user to define a set of predefined classification labels from which the semantic label is selected, or alternatively to not limit the semantic label to a member of a predefined set.

According to this aspect, computing the encoded image features may include sampling a plurality of windows of the image. The plurality of windows may each have a window size that is smaller than a total size of the image. The above features may have the technical effect of allowing a pre-trained feature extractor to be used even when the image has a different size from the input size of the pretrained feature extractor.

According to this aspect, the method may further include computing a context query associated with a bounding box that surrounds the region of interest. The method may further include receiving the context query as input. The above features may have the technical effect of incorporating contextual information from a region of the image surrounding the region of interest when the visual resampler computes the mask query.

According to this aspect, the mask query may be computed at a visual resampler. The visual resampler may have a transformer architecture that includes a plurality of transformer layers, each of which includes a self-attention layer, a masked cross-attention layer, a context cross-attention layer, a first feed-forward layer, and a second feed-forward layer. The above features may have the technical effect of allowing the visual resampler to summarize the region of interest while retaining access to contextual content.

According to this aspect, the method may further include training the visual resampler with a training corpus including a plurality of training images, a plurality of ground-truth masks associated with respective training regions of interest within the training images, and a plurality of ground-truth labels associated with the ground-truth masks. The above features may have the technical effect of training the visual resampler to generate mask queries in a manner that matches the distribution of the training corpus.

According to this aspect, the visual resampler may be trained via instruction tuning. The above feature may have the technical effect of facilitating integration of the visual resampler with the generative language model during training.

According to this aspect, the training corpus may be a union of a plurality of training data subsets in which the corresponding ground-truth labels have different respective label spaces. The method may further include computing a plurality of mode queries that are respectively associated with the training data subsets and indicate the respective label spaces. The method may further include, at the visual resampler, receiving the mode queries during training. The above features may have the technical effect of training the visual resampler to recognize multiple different sets of predefined classification labels when used in the vocabulary-specific mode at runtime.

According to another aspect of the present disclosure, a computing system is provided, including one or more processing devices configured to receive an image. The one or more processing devices are further configured to compute a segmentation mask that identifies a region of interest included in the image. The one or more processing devices are further configured to compute a plurality of encoded image features based at least in part on the image. The one or more processing devices are further configured to compute a context query associated with a bounding box that surrounds the region of interest. The one or more processing devices are further configured to receive a text instruction. The one or more processing devices are further configured to receive a mode query that indicates a vocabulary specificity mode. The one or more processing devices are further configured to compute a mask query based at least in part on the segmentation mask, the plurality of encoded image features, the context query, the text instruction, and the mode query, the mask query including a plurality of text tokens. The one or more processing devices are further configured to receive a natural language query that includes the mask query and the text instruction. Based at least in part on the natural language query, the one or more processing devices are further configured to generate a semantic label associated with the region of interest. The one or more processing devices are further configured to output the semantic label. The above features may have the technical effect of labeling a region of interest in the image in a generative manner that allows for increased variety among labels, while also maintaining consistency in the level of specificity of the labels.

"And/or" as used herein is defined as the inclusive or V, as specified by the following truth table:

| A | B | A $\vee$ B |
|---|---|---|
| True | True | True |
| True | False | True |
| False | True | True |
| False | False | False |

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system comprising:
one or more processing devices configured to:
receive an image;
compute a segmentation mask that identifies a region of interest included in the image;
at a feature extractor, compute a plurality of encoded image features based at least in part on the image;
receive a text instruction that includes a plurality of instruction text tokens;
at a visual resampler that includes a plurality of transformer layers, compute a mask query based at least in part on the segmentation mask, the plurality of encoded image features, and the text instruction, the mask query including a plurality of mask query text tokens that are iteratively recomputed over the plurality of transformer layers;
at a generative language model:
receive a natural language query that includes the mask query and the text instruction; and based at least in part on the natural language query, generate a semantic label associated with the region of interest; and output the semantic label; and wherein the visual resampler is further configured to:

receive a mode query that indicates a vocabulary specificity mode; and compute the mask query based at least in part on the mode query.

2. The computing system of claim 1, wherein the natural language query further includes the mode query.

3. The computing system of claim 2, wherein the vocabulary specificity mode is:

a vocabulary-specific mode in which the mode query includes a plurality of predefined classification labels; or a vocabulary-agnostic mode in which the mode query does not include predefined classification labels.

4. The computing system of claim 1, wherein:

the one or more processing devices are configured to compute the encoded image features at least in part by sampling a plurality of windows of the image; and the plurality of windows each have a window size that is smaller than a total size of the image.

5. The computing system of claim 1, wherein:

the one or more processing devices are further configured to compute a context query associated with a bounding box that surrounds the region of interest; and the visual resampler is further configured to receive the context query as input.

6. The computing system of claim 1, wherein each of the transformer layers includes:

a self-attention layer;

a masked cross-attention layer;

a context cross-attention layer;

a first feed-forward layer; and a second feed-forward layer.

7. The computing system of claim 1, wherein the visual resampler is trained with a training corpus including:

a plurality of training images;

a plurality of ground-truth masks associated with respective training regions of interest within the training images; and a plurality of ground-truth labels associated with the ground-truth masks.

8. The computing system of claim 7, wherein the visual resampler is trained via instruction tuning.

9. The computing system of claim 7, wherein:

the training corpus is a union of a plurality of training data subsets in which the corresponding ground-truth labels have different respective label spaces;

the one or more processing devices are further configured to compute a plurality of mode queries that are respectively associated with the training data subsets and indicate the respective label spaces; and the visual resampler is further configured to receive the mode queries during training.

10. A method for image processing, the method comprising:

receiving an image;

computing a segmentation mask that identifies a region of interest included in the image;

computing a plurality of encoded image features based at least in part on the image;

receiving a text instruction that includes a plurality of instruction text tokens;

at a visual resampler that includes a plurality of transformer layers, computing a mask query based at least in part on the segmentation mask, the plurality of encoded image features, and the text instruction, the mask query including a plurality of mask query text tokens that are iteratively recomputed over the plurality of transformer layers;

receiving a natural language query that includes the mask query and the text instruction; and based at least in part on the natural language query, generating a semantic label associated with the region of interest; and outputting the semantic label; and further comprising:

receiving a mode query that indicates a vocabulary specificity mode; and computing the mask query based at least in part on the mode query.

11. The method of claim 10, wherein:

the natural language query further includes the mode query; and the vocabulary specificity mode is:

a vocabulary-specific mode in which the mode query includes a plurality of predefined classification labels; or a vocabulary-agnostic mode in which the mode query does not include predefined classification labels.

12. The method of claim 10, wherein:

computing the encoded image features includes sampling a plurality of windows of the image; and the plurality of windows each have a window size that is smaller than a total size of the image.

13. The method of claim 10, further comprising:

computing a context query associated with a bounding box that surrounds the region of interest; and receiving the context query as input.

14. The method of claim 10, wherein each of which each of the transformer layers includes:

a self-attention layer;

a masked cross-attention layer;

a context cross-attention layer;

a first feed-forward layer; and a second feed-forward layer.

15. The method of claim 14, further comprising training the visual resampler with a training corpus including:

a plurality of training images;

a plurality of ground-truth masks associated with respective training regions of interest within the training images; and a plurality of ground-truth labels associated with the ground-truth masks.

16. The method of claim 15, wherein the visual resampler is trained via instruction tuning.

17. The method of claim 15, wherein:

the training corpus is a union of a plurality of training data subsets in which the corresponding ground-truth labels have different respective label spaces; and the method further comprises:

computing a plurality of mode queries that are respectively associated with the training data subsets and indicate the respective label spaces; and at the visual resampler, receiving the mode queries during training.

18. A computing system comprising:

one or more processing devices configured to:

receive an image;

compute a segmentation mask that identifies a region of interest included in the image;
compute a plurality of encoded image features based at least in part on the image;
compute a context query associated with a bounding box that surrounds the region of interest;
receive a text instruction that includes a plurality of instruction text tokens;
receive a mode query that indicates a vocabulary specificity mode;
at a visual resampler that includes a plurality of transformer layers, compute a mask query based at least in part on the segmentation mask, the plurality of encoded image features, the context query, the text instruction, and the mode query, the mask query including a plurality of mask query text tokens that are iteratively recomputed over the plurality of transformer layers;
receive a natural language query that includes the mask query and the text instruction;
based at least in part on the natural language query, generate a semantic label associated with the region of interest; and
output the semantic label.

* * * * *